United States Patent
Shan et al.

(10) Patent No.: US 12,433,594 B2
(45) Date of Patent: Oct. 7, 2025

(54) ANASTOMOSIS PROTECTION DEVICE

(71) Applicant: Touchstone International Medical Science Co., Ltd., Suzhou (CN)

(72) Inventors: Teng Shan, Suzhou (CN); Wangdong Chen, Suzhou (CN); Yuanyang Cao, Suzhou (CN)

(73) Assignee: Touchstone International Medical Science Co., Ltd., Suzhou (CN)

( * ) Notice: Subject to any disclaimer, the term of this patent is extended or adjusted under 35 U.S.C. 154(b) by 269 days.

(21) Appl. No.: 18/253,315

(22) PCT Filed: Nov. 19, 2021

(86) PCT No.: PCT/CN2021/131646
§ 371 (c)(1),
(2) Date: May 17, 2023

(87) PCT Pub. No.: WO2022/105853
PCT Pub. Date: May 27, 2022

(65) Prior Publication Data
US 2024/0023964 A1    Jan. 25, 2024

(30) Foreign Application Priority Data

Nov. 20, 2020 (CN) .......................... 202011311153.X
Nov. 20, 2020 (CN) .......................... 202011314455.2
(Continued)

(51) Int. Cl.
*A61B 17/11* (2006.01)
*A61B 17/00* (2006.01)

(52) U.S. Cl.
CPC . *A61B 17/1114* (2013.01); *A61B 2017/00557* (2013.01); *A61B 2017/00876* (2013.01); *A61F 2220/0008* (2013.01)

(58) Field of Classification Search
CPC ................. A61B 17/11; A61B 17/1114; A61B 2017/1117; A61B 2017/1103;
(Continued)

(56) References Cited

U.S. PATENT DOCUMENTS 8,636,810 B2    1/2014  Rousseau
9,078,656 B2    7/2015  Rousseau
(Continued)

FOREIGN PATENT DOCUMENTS

CN    105496487 A    4/2016
CN    205458860 U    8/2016
(Continued)

OTHER PUBLICATIONS

Russian Patent No. 2023114524 1st Office Action with English Translation dated Dec. 7, 2023.
(Continued)

*Primary Examiner* — Diane D Yabut
(74) *Attorney, Agent, or Firm* — Fox Rothschild LLP

(57) ABSTRACT

An anastomosis protection device is provided, including: a protective sleeve located inside a tubular tissue and positioned correspondingly to the anastomotic stoma; at least one fixing assembly, wherein the fixing assembly comprises at least one first fixing member and at least one second fixing member, wherein the first fixing member is provided on an outer wall of the tubular tissue, the second fixing member is provided on an inner surface of the protective sleeve and positioned correspondingly to the first fixing member, and the first fixing member and the second fixing member being relatively fixed by means of magnetic attraction. The device provides an extension and retraction space for the tissue.

19 Claims, 43 Drawing Sheets

(30) Foreign Application Priority Data

| Nov. 20, 2020 | (CN) | 202022704636.8 |
| Nov. 20, 2020 | (CN) | 202022714234.6 |
| Nov. 20, 2020 | (CN) | 202022714356.5 |
| Nov. 20, 2020 | (CN) | 202022714425.2 |
| Nov. 20, 2020 | (CN) | 202022714586.1 |

(58) Field of Classification Search
CPC ....... A61B 2017/1107; A61B 2017/111; A61B 2017/1132; A61B 2017/00876; A61F 2/04; A61F 2/064; A61F 2/0076; A61F 2002/045

See application file for complete search history.

(56) References Cited

U.S. PATENT DOCUMENTS

| 2005/0283235 | A1* | 12/2005 | Kugler | A61F 5/0069 |
| | | | | 600/30 |
| 2010/0256775 | A1* | 10/2010 | Belhe | A61F 5/0076 |
| | | | | 623/23.65 |
| 2011/0009690 | A1* | 1/2011 | Belhe | A61F 5/0076 |
| | | | | 600/37 |
| 2011/0106273 | A1* | 5/2011 | Belhe | A61F 5/0076 |
| | | | | 623/23.64 |
| 2011/0137428 | A1* | 6/2011 | Terliuc | A61F 2/95 |
| | | | | 604/8 |
| 2011/0160752 | A1* | 6/2011 | Aguirre | A61B 17/1114 |
| | | | | 606/153 |
| 2019/0183507 | A1* | 6/2019 | Baillargeon | A61B 17/1114 |
| 2019/0261998 | A1* | 8/2019 | Altman | A61B 17/12009 |
| 2019/0274687 | A1 | 9/2019 | Wang et al. | |
| 2020/0188081 | A1* | 6/2020 | Shelton, IV | A61B 17/12013 |

FOREIGN PATENT DOCUMENTS

| CN | 205625990 U | 10/2016 |
| CN | 207886292 U | 9/2018 |
| CN | 213787601 U | 7/2021 |
| CN | 213787602 U | 7/2021 |
| CN | 213787603 U | 7/2021 |
| CN | 213787604 U | 7/2021 |
| CN | 214231551 U | 9/2021 |
| RU | 2123300 C1 | 12/1998 |
| RU | 2602944 C2 | 11/2016 |
| SU | 1725851 A1 | 4/1992 |

OTHER PUBLICATIONS

International Search Report issued on Feb. 15, 2022 for International Patent Application No. PCT/CN2021/131646 (6 pages).

* cited by examiner

ANASTOMOSIS PROTECTION DEVICE

CROSS-REFERENCE TO RELATED APPLICATIONS

This application is based upon PCT patent application No. PCT/CN2021/131646, filed on Nov. 19, 2021, which claims priority to Chinese Patent Applications No. 202011311153.X, and No. 202022714586.1, No. 202022714234.6, No. 202022714425.2, No. 202011314455.2, No. 202022714356.5, No. 202022704636.8, filed on Nov. 20, 2020, the entire contents of which are incorporated herein by reference.

TECHNICAL FIELD

The present disclosure relates to medical instruments' technology, more particularly, to an anastomosis protection device.

BACKGROUND

After anastomoses surgery of intestine is operated, an anastomotic stoma is formed. In order to avoid a tension applied by feces on the anastomotic stoma or avoid contamination and infection to the anastomotic stoma caused by feces, the anastomotic stoma needs to be protected.

The existing method of protecting the anastomotic stoma generally includes: setting a tubular sleeve inside the intestine, the tubular sleeve covering an inner surface of the intestine at a position corresponding to the anastomotic stoma, using the tubular sleeve to guide the feces out of the human body. This method effectively protects the anastomotic stoma, and further allows for removing the tubular sleeve without a need for secondary surgery after physiological tissues at the anastomotic stoma are healed. In order to better fix the tubular sleeve at a desired position, a fixing strap with a fixed diameter surrounding the intestine needs to be installed on the outside of the tubular sleeve. However, this fixed strap inevitably applies a certain continuous pressure on the intestine, thereby hindering normal peristalsis of the intestine, and may cause problems such as poor blood supply around the anastomotic stoma due to the continuous pressure from the fixed strap.

SUMMARY

To solve the problems in the prior art, the present disclosure provides an anastomosis protection device, to provide a circumferential extension and retraction space for the tubular tissue and ensure normal blood supply around the anastomotic stoma.

In the present disclosure, an anastomosis protection device is provided, including:
  a protective sleeve located inside a tubular tissue and positioned correspondingly to an anastomotic stoma;
  at least one fixing assembly, wherein the fixing assembly comprises at least one first fixing member and at least one second fixing member, wherein the first fixing member is provided on an outer wall of the tubular tissue, the second fixing member is provided on an inner surface of the protective sleeve and positioned correspondingly to the first fixing member, and the first fixing member and the second fixing member being relatively fixed by means of magnetic attraction.

In some embodiments, the fixing assembly comprises a plurality of the first fixing members and a plurality of the second fixing members, wherein the first fixing members are arranged sequentially along a circumferential direction of the tubular tissue, and the second fixing members are arranged sequentially along the circumferential direction of the tubular tissue.

In some embodiments, the first fixing member and the corresponding second fixing member forms a pair of fixing members, wherein in each pair of fixing members, both the first fixing member and the second fixing member are magnetic members; or, one of the first fixing member and the second fixing member is a magnetic member, and the other one is a non-magnetic member.

In some embodiments, the fixing assembly comprises a plurality of the first fixing members and a plurality of the second fixing members, the plurality of the first fixing members are arranged at intervals, and the plurality of the second fixing members are arranged at intervals.

In some embodiments, the fixing assembly is provided at an upstream side of the anastomotic stoma.

In some embodiments, one end of the protective sleeve located at the upstream of the anastomotic stoma is provided with a support portion, the support portion is expandable and contractable in a radial direction of the protective sleeve, and the fixing assembly is arranged between the anastomotic stoma and the support portion.

In some embodiments, there are two fixing assemblies, one of the fixing assemblies is located at an upstream side of the anastomotic stoma, and the other one is located at a downstream side of the anastomotic stoma.

In some embodiments, the fixing assembly further comprises at least one connector, which comprises a first connector being configured to accommodate the first fixing member, and the first connector surrounds the outer wall of the tubular tissue.

In some embodiments, the first connector is provided with a connection structure, and the first connector is configured to be connected at the connection structure to surround the outer wall of the tubular tissue or disconnected at the connection structure to be separated from the outer wall of the tubular tissue.

In some embodiments, the fixing assembly further comprises at least one connector, which comprises a second connector being configured to accommodate the second fixing member, and the second connector is positioned at the inner surface of the protective sleeve.

In some embodiments, the second connector is integrally formed with the protective sleeve.

In some embodiments, when the connector is installed at the tubular tissue, the connector is retractable along a circumferential direction of the tubular tissue.

In some embodiments, the connector is elastic and comprises an accommodating portion and an elastic connecting portion, the accommodating portion is configured to accommodate the first fixing member and/or the second fixing member, and the elastic connecting portion is connected between two adjacent accommodating portions.

In some embodiments, the accommodating portion and the elastic connecting portion meet at least one of the following conditions:
  an elasticity of the accommodating portion is smaller than an elasticity of the elastic connecting portion;
  a width of the accommodating portion is adapted to a width of the first fixing member or the second fixing member, and the width of the accommodating portion is greater than a width of the elastic connecting portion;
  a thickness of the accommodating portion is greater than a thickness of the elastic connecting portion;

the accommodating portion is a circular structure surrounding the first fixing member or the second fixing member, and a width of a wall of the circular structure is greater than the width of the elastic connecting portion.

In some embodiments, the connector is made of bioabsorbable materials.

In some embodiments, the fixing assembly further comprises at least one connector, which comprises a first connector being configured to accommodate the first fixing member and/or a second connector being configured to accommodate the second fixing member, wherein the first connector surrounds the outer wall of the tubular tissue, and the second connector is positioned on the inner surface of the protective sleeve, the second connector is positioned correspondingly to the first connector;

a circumference of the first fixing member is at least partially provided with a mounting groove, and an inner circumference of the first connector is embedded in the mounting groove, or the inner circumference of the first connector is at least partially provided with at least one mounting groove, and the first fixing member is embedded in the mounting groove;

a circumference of the second fixing member is at least partially provided with a mounting groove, and an inner circumference of the second connector is embedded in the mounting groove, or the inner circumference of the second connector is at least partially provided with at least one mounting groove, and the second fixing member is embedded in the mounting groove.

In some embodiments, the inner surface of the protective sleeve is provided with at least one mounting groove in one-to-one correspondence to the second fixing member, and the second fixing member is embedded in the corresponding mounting groove.

In some embodiments, the second fixing portion and the mounting groove are in interference fit.

In some embodiments, the mounting groove is a recess provided on the inner surface of the protective sleeve, or the mounting groove is formed by a circular mounting member protruding from the inner surface of the protective sleeve.

In some embodiments, a surface of the first fixing member facing the tubular tissue is arc-shaped, and a surface of the second fixing member facing the tubular tissue is arc-shaped.

In some embodiments, the first fixing member is made of bioabsorbable material, and/or the second fixing member is made of bioabsorbable material.

In some embodiments, the first fixing member is a magnetic member, and/or the second fixing member is a magnetic member.

In some embodiments, the first fixing member is bioabsorbable and magnetic, and/or the second fixing member is bioabsorbable and magnetic.

In some embodiments, the fixing assembly comprises a plurality of the first fixing members, wherein the first fixing members are sequentially connected end to end to form a circle, and a connecting portion formed between two adjacent first fixing members is extendable and retractable; and/or, the fixing assembly comprises a plurality of the second fixing members, wherein the second fixing members are sequentially connected end to end to form a circle, and a connecting portion formed between two adjacent second fixing members is retractable.

In some embodiments, magnetic particles are distributed in the first fixing member and/or the second fixing member.

In some embodiments, magnetic particles are distributed in both of the first fixing member and the second fixing member, the magnetic particles in the first fixing member have a same magnetic property, while the magnetic particles in the second fixing member have a same magnetic property, which is opposite to the magnetic property of the magnetic particles in the first fixing member.

In some embodiments, a surface of the first fixing member and/or a surface of the second fixing member is coated with a first magnetic particle coating, or, the first fixing member and/or the second fixing member is doped with magnetic particles internally.

In some embodiments, the first fixing member comprises a first connector surrounding the outer wall of the tubular tissue, wherein the first connector is provided with at least one first magnetic portion, a surface of the first magnetic portion is coated with a third magnetic particle coating or the first magnetic portion is doped with magnetic particles internally; and/or, the second fixing member comprises a second connector surrounding the outer wall of the tubular tissue, wherein the second connector is provided with at least one second magnetic portion, a surface of the second magnetic portion is coated with a fourth magnetic particle coating or the second magnetic portion is doped with magnetic particles internally.

In some embodiments, the second fixing member comprises at least one second magnetic particle coating, which is coated on the inner surface of the protective sleeve.

In some embodiments, the device further comprises:

an operating assembly comprising a first operating member and a second operating member, wherein the first operating member is connected to a first end of the first connector, and the second operating member is relatively fixed to the first operating member in a first direction;

the first connector has a first state and a second state, when the first connector is in the first state, a second end of the first connector is connected to the second operating member, the first connector surrounds the outer wall of the tubular tissue, and the second operating member extends at least partially out of body;

when the first connector is in the second state, the second end of the first connector separates from the second operating member, and the first connector is in an unclosed strip shape that is detachable from the outer wall of the tubular tissue.

In some embodiment, the first operating member is tubular and sleeved outside the second operating member, and the first direction is an axial direction of the first operating member at a first end of the first operating member;

the second operating member is rotatable relative to the first operating member, the second end of the first connector has a first threaded portion, a first end of the second operating member has a second threaded portion, when the first connector is in the first state, the first threaded portion is threaded connected to the second threaded portion.

In some embodiment, the second operating member comprises:

an inflatable balloon relatively fixed to the first operating member in the first direction, and the balloon having a third state and a fourth state; and an inflation tube, a first end of the inflation tube connected to an interior of the balloon and configured to inflate or deflate the balloon;

wherein the second end of the first connector is provided with a balloon matching portion, when the first connector is in the first state, and the balloon is in the third state, the balloon is fixed with the balloon matching portion, a second end of the inflation tube extends out of the body; when the first connector is in the second state, and the balloon is in the fourth state, the balloon is detachable from the balloon matching portion.

In some embodiment, when the first connector is in the first state, the second end of the first connector and the second operating member are connected through a detachable connection structure, and the connection structure is located outside the body.

The anastomosis protection device has the following advantages.

The present disclosure protects the inner surface of the anastomosis through a protective sleeve, so contents in the tubular tissue won't contaminate the anastomotic stoma when passing through. The protective sleeve is fixed at the desired position through magnetic attraction between the first fixing member and the second fixing member. In this device, only the magnetic attraction position between the first fixing member and the second fixing member is relatively fixed, and a circumferential length can be elastically adjustable, providing sufficient circumferential extension and retraction space for the tissue. During the peristalsis of contents inside the tissue or the tissue itself, the device ensures normal blood supply around the anastomotic stoma. The anastomosis protection device of the present disclosure can be applied to the intestine or other tubular tissues in the human body, such as tubular tissues at other positions of the digestive tract.

BRIEF DESCRIPTION OF THE DRAWINGS

Embodiments of the present disclosure will now be described, by way of example only, with reference to the accompanying schematic drawings. Apparently, the following FIGS. are only exemplary. For the skilled in the art, other FIGS. can also be gotten according to the following figures without creative work.

DETAILED DESCRIPTION

Figure 1:
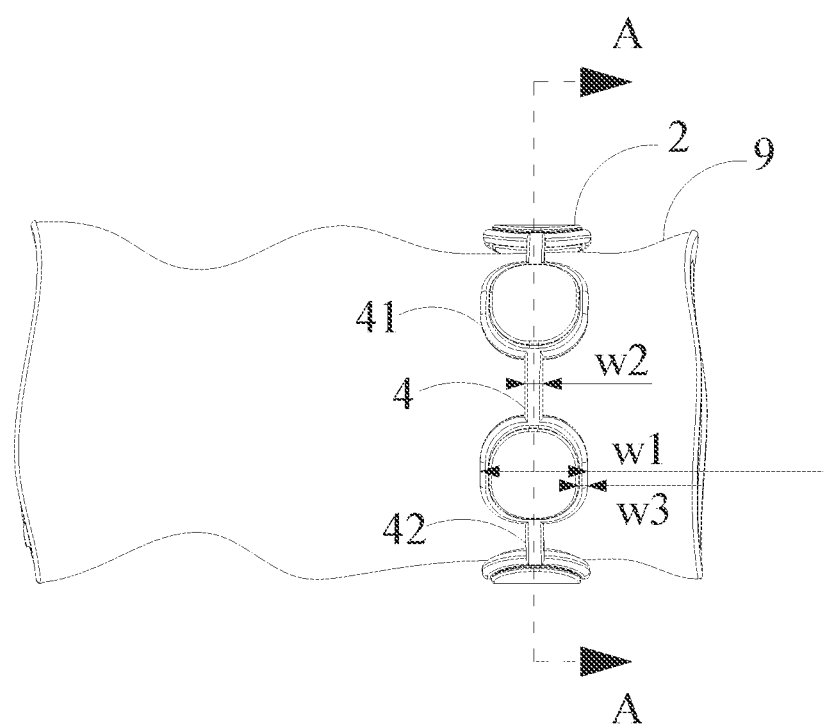
FIG. 1 is a structural schematic view of an anastomosis protection device applied to intestine according to a first embodiment of the present disclosure.
Figure 2:
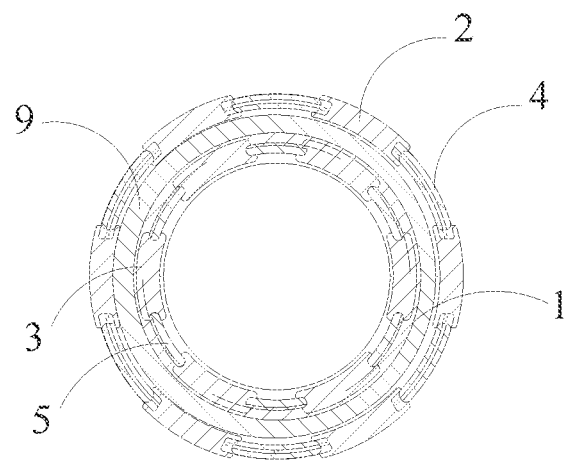
FIG. 2 is a cross-sectional view in A-A direction of FIG. 1.

The exemplary embodiments will be described more comprehensively referring to the accompanying drawings. However, the exemplary embodiments can be implemented in a plurality of forms and should not be limited to the embodiments described herein. On the contrary, these embodiments are provided to make the present disclosure comprehensive and complete, and comprehensively convey the concept of exemplary embodiments to those skilled in the art. The same reference numerals in the drawings represent the same or similar structures, so repeated descriptions of them will be omitted.

The present disclosure provides an anastomosis protection device, which includes a protective sleeve and at least one fixing assembly. The protective sleeve is located inside a tubular tissue and positioned correspondingly to an anastomotic stoma. The protective sleeve protects an inner surface of the anastomotic stoma, so that contents in the tubular tissue won't contaminate the anastomotic stoma when the protective sleeve guides the contents to pass through the tubular tissue. The fixing assembly includes at least one first fixing member and at least one second fixing member, wherein the first fixing member is located on an outer wall of the tubular tissue, the second fixing member is arranged on an inner surface of the protective sleeve and positioned correspondingly to the first fixing member, and the first fixing member and the second fixing member being relatively fixed by means of magnetic attraction. Therefore, the magnetic attraction between the first fixing member and the second fixing member keeps the protective sleeve at a required position.

The fixing strap in existing technology has a fixed circumference, cannot be elastically expanded to adapt to natural contraction of tissues. In the device of the present disclosure, only the magnetic attraction positions between the first fixing member and second fixing member are relatively fixed, and a circumference of the device can be elastically increased or decreased, providing sufficient circumferential extension and retraction space for the tissue. During the peristalsis of contents inside the tissue or the tissue itself, the device ensures normal blood supply around the anastomotic stoma.

The following is a detailed structural introduction of the anastomosis protection device for each specific embodiment of the present disclosure, combined with the accompanying drawings. It can be understood that each specific embodiment is not a limitation of the protection scope of the present disclosure. In various embodiments, intestinal tissue is used as an example for explanation. It can be understood that in other embodiments, the tubular tissue is not limited to intestinal tissue, but can also be other tubular tissues in the human body, such as tubular tissues in other positions in the digestive tract, all of which fall within the protection scope of the present disclosure. In the description, a component being made of some materials, means that the component is made of one or more kinds of these materials.

FIGS. 1-6 are structural schematic views of the anastomosis protection device applied to intestinal tissue 9 according to a first embodiment of the present disclosure. As shown in FIGS. 1-4, the device includes a protective sleeve 1 and a fixing assembly. The protective sleeve 1 is located inside the intestinal tissue 9 and positioned correspondingly to an anastomotic stoma, that is, two ends of the protective sleeve 1 are located on both sides of the anastomotic stoma, respectively, so the protective sleeve 1 fully covers the anastomotic stoma. The anastomosis protective device fits a tissue wall of the protected tissue. The protective sleeve 1 protects an inner surface of the anastomotic stoma, so intestinal contents won't contaminate the anastomotic stoma when guided to pass through the intestine.

Figure 3:
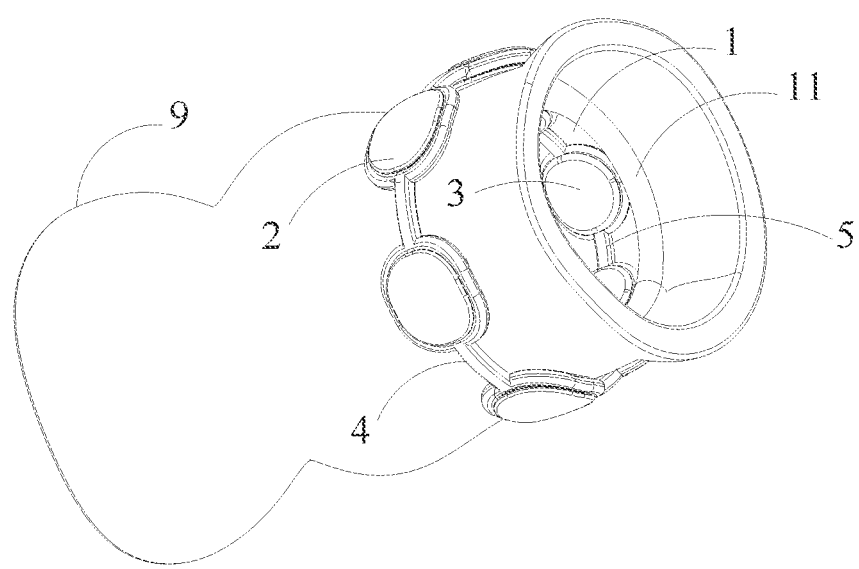
FIG. 3 is a three-dimensional view of the anastomosis protection device applied to intestine according to the first embodiment of the present disclosure.
Figure 4:
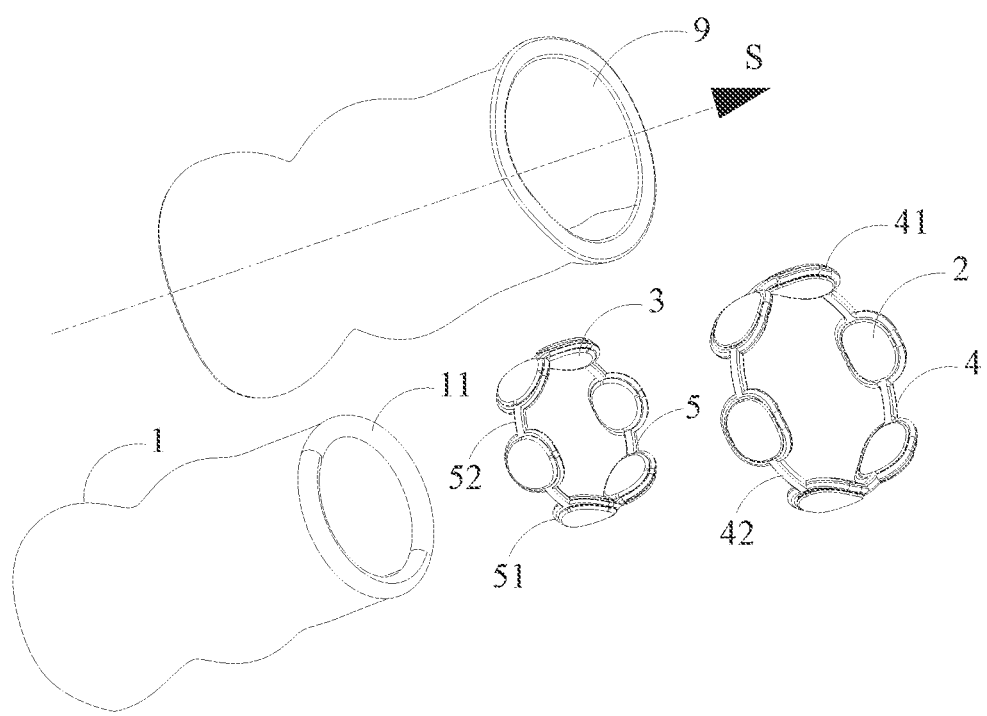
FIG. 4 is an exploded view of FIG. 3.

As shown in FIGS. 3 and 4, the fixing assembly includes a plurality of first fixing members 2 and a plurality of second fixing members 3. The first fixing members 2 are located on an outer wall of intestinal tissue 9, the second fixing members 3 are located on an inner surface of the protective sleeve 1 and positioned correspondingly to the first fixing members 2. The first fixing members 2 and the second fixing members 3 are relatively fixed by means of magnetic attraction. Specifically, the first fixing members 2 and/or the second fixing members 3 are magnetic members, so the first fixing members 2 can be magnetically attracted to the corresponding second fixing members 3. Therefore, the first fixing members 2 are attached to the outer wall of the intestinal tissue 9, and the second fixing members 3 are attached to the inner surface of the protective sleeve 1, thereby maintaining the position of the protective sleeve 1 relative to the intestinal tissue 9 through the fixing function between the first fixing members 2 and the second fixing members 3. For example, the first fixing member 2 and the corresponding second fixing member 3 both are magnetic members, that is, the first fixing members 2 and the second fixing members 3 are made of magnetic materials, such as magnets. Alternatively, the first fixing members 2 are magnetic members, while the second fixing members 3 are made of non-magnetic materials that can be attracted by magnets, such as iron, nickel, cobalt or other metals and their alloys. Alternatively, the first fixing members 2 are non-magnetic members and can be attracted by magnets, while the second fixing members 3 are magnetic members. Alternatively, some of the first fixing members 2 are magnetic members, while the other first fixing members 2 are non-magnetic members and can be attracted by magnets. The second fixing members 3 corresponding to the magnetic first fixing members 2 are non-magnetic members and can be attracted by magnets. The other part of the second fixing members 3 corresponding to the non-magnetic first fixing members are magnetic. Alternatively, some of the second fixing members 3 are magnetic, while the other part of the second fixing members 3 are non-magnetic members. Correspondingly, only some of the first fixing members 2 are magnetic or all of the first fixing members 2 are magnetic.

The fixing assembly is selectively arranged at an upstream side of the anastomotic stoma to fix the protective sleeve 1, so that the protective sleeve 1 cannot move towards a downstream side of the anastomotic stoma and can keep protecting the anastomotic stoma. In the present disclosure, the upstream of the anastomotic stoma and the downstream are terms described as referring to a moving direction of the contents in the intestine, that is, the intestinal contents move from the upstream side of the anastomotic stoma to the downstream side of the anastomotic stoma. When the anastomosis protection device is applied to a lower position of the intestine, the protective sleeve 1 guides the feces through the intestine, moving from the upstream side of the anastomotic stoma to the downstream side of the anastomotic stoma.

For the reason that only the magnetic attraction positions between the first fixing members 2 and the second fixing members 3 are relatively fixed, the circumference of the device can be elastically adjusted, providing sufficient circumferential extension and retraction space for the intestine. During the peristalsis of contents inside the tissue or the tissue itself, the device ensures normal blood supply around the anastomotic stoma. During the peristalsis of intestinal tissue 9 or the contents, the first fixing members 2 and the second fixing members 3 can move with the peristalsis of intestinal tissue 9. A distance between adjacent first fixing members 2 can change, and a distance between adjacent second fixing members 3 can also change, thus the anastomosis protection device forming a structure with an adjustable circumference as a whole.

As shown in FIG. 4, in this embodiment, the protective sleeve 1 is a tubular protective sleeve that can provide circumferential protection for the anastomotic stoma. The protective sleeve 1 can be a thin-walled flexible film sleeve, such as a rubber film sleeve, a silicone film sleeve, etc., but the present disclosure is not limited to this. In other alternative embodiments, the protective sleeve 1 can also adopt other shapes, which completely or partially cover the inner wall of the anastomotic stoma, all of which fall within the protection scope of the present disclosure.

As shown in FIGS. 3 and 4, an end of the protective sleeve 1 located at an upstream of the anastomotic stoma is provided with a support portion 11, which is expandable and contractable in a radial direction of the protective sleeve 1. When the support portion 11 contracts in the radial direction, the protective sleeve 1 can be placed into or taken out of the intestinal tissue 9 as a whole. After the protective sleeve 1 is placed at the desired position, the support portion 11 expands in the radial direction to support the protective sleeve 1, achieving better attaching and sealing effect with the intestinal wall, and preventing the contents from entering the anastomotic stoma. The support portion 11 is an inflatable and deflatable circular elastic airbag, and an outer wall of the airbag is elastic. For example, the airbag can be made of elastic rubber, silicone, TPU, thin PC material etc. After inflation, the airbag attaches to the tissue wall, and when there are contents passing through, the circumference of the airbag can be increased, to fit the intestine better. The support portion 11 can also use other structures, such as a radially expandable spring or a radially movable slider, which allow the support portion 11 to expand or contract radially. The fixing assembly is arranged between the anastomotic stoma and the support portion 11, and the protective sleeve 1 can be better maintained at the anastomotic stoma position through cooperation between the fixing assembly and the support portion 11.

As shown in FIGS. 3 and 4, the fixing assembly includes a plurality of first fixing members 2 and a plurality of second fixing members 3. The first fixing members 2 and second fixing members 3 are arranged sequentially along the circumferential direction of the intestinal tissue 9 to fix the protective sleeve 1 uniformly and stably. In this embodiment, the first fixing members 2 are arranged at intervals, and the second fixing members 3 are arranged at intervals. The quantity of the first fixing members 2 and the second fixing members 3 can also be selected and changed according to different requirements, and a one-to-one correspondence, one-to-many relationship, or many-to-one relationship, can be formed between the first fixing members 2 and the second fixing members 3, all of which fall within the protection scope of the present disclosure. In other alternative embodiments, there can be only one first fixing member 2 and/or only one second fixing member 3. In order to magnetically attract the first fixing members 2 with the second fixing members 3, the first fixing member 2 and the corresponding second fixing member 3 are both magnetic members, or one is a magnetic member, and the other is a non-magnetic member, that is, the first fixing member 2 and the corresponding second fixing member 3 form a pair of fixing members, wherein both are magnetic members, or one is a magnetic member, and the other is a non-magnetic member.

As shown in FIGS. 3 and 4, a surface of the first fixing member 2 facing the intestinal tissue 9 is an arc-shaped surface, and a shape of the arc-shaped surface is substantially adapted to the outer wall of the intestinal tissue 9, so as to achieve better attachment between the first fixing member 2 and the outer wall of the intestinal tissue 9. The surface of the second fixing member 3 facing the protective sleeve 1 is an arc-shaped surface, and the shape of the arc-shaped surface is substantially adapted to the inner surface of the protective sleeve 1, so as to achieve a better attachment between the second fixing member 3 and the inner surface of the protective sleeve 1.

Furthermore, in another alternative embodiment, the surface of the first fixing member 2 facing the intestinal tissue 9 and/or the surface of the second fixing member 3 facing the protective sleeve 1 may also be in a wavy shape. Specifically, the surface of the first fixing member 2 facing the intestinal tissue 9 is a wavy surface that ups and downs along a length direction of the intestinal tissue 9 (S direction as shown in FIG. 4), which can better adapt to the outer wall of the intestinal tissue 9, increase the contact area between the first fixing members 2 and the intestinal tissue 9, and achieve better cooperation between the first fixing members 2 and the outer wall of the intestinal tissue 9. The surface of the second fixing member 3 facing the protective sleeve 1 is a wavy surface that ups and downs along the length direction of the intestinal tissue 9 (S direction as shown in FIG. 4), which can increase the contact area between the second fixing members 3 and the protective sleeve 1, achieve better cooperation between the second fixing members 3 and the inner wall of the protective sleeve 1. This wavy surface can also be applied to the first fixing members 2 and/or the second fixing members 3 of other embodiments of the present disclosure.

Figure 5:
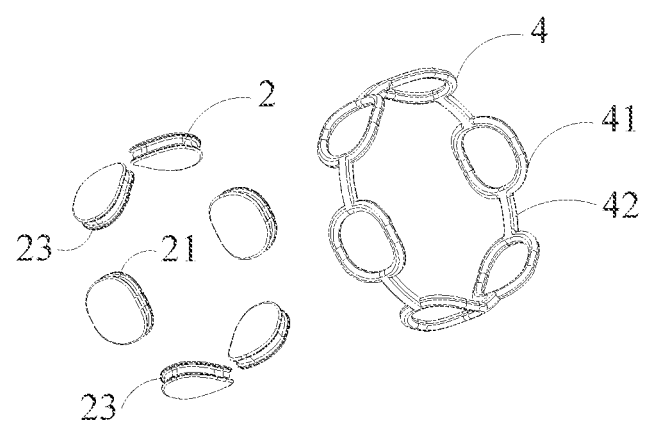
FIG. 5 is a schematic view of a cooperation between a first fixing member and a first connector according to the first embodiment of the present disclosure.

As shown in FIGS. 4 and 5, the fixing assembly further includes a first connector 4 being configured to accommodate the first fixing members 2. When the first connector 4 is installed at the intestinal tissue 9, the first connector 4 surrounds the outer wall of the intestinal tissue 9, forming a connecting ring structure, thereby fixing the protective sleeve 1 in the circumferential direction together with the first fixing members 2. The first connector 4 includes a plurality of first accommodating portions 41 and a plurality of first connecting portions 42. The first accommodating portions 41 are in one-to-one correspondence with the first fixing members 2, and the first accommodating portion 41 accommodates the corresponding first fixing member 2. The first connecting portion 42 is connected between two adjacent first accommodating portions 41. When the first connector 4 surrounds the outer wall of the intestinal tissue 9, a circumference of the first connector 4 is adjustable. Furthermore, the first connector 4 can be at least partially elastic, and at least the first connecting portions 42 are elastic. Therefore, during intestinal peristalsis, the first connector 4 can be elastically deformed with the intestinal peristalsis, without applying limiting pressure on the intestine, providing an extension and retraction space for the intestine. For example, the first connector 4 can be an elastic connector made of materials with a certain elasticity, such as rubber, silicone, etc. The first connector 4 can be arranged parallel to the support portion 11. When the first connecting portions 42 and the first accommodating portions 41 are elastic, an elasticity of the first accommodating portions 41 can be less than an elasticity of the first connecting portions 42. Thus, the first accommodating portions 41 can better fix the first fixing members 2, and the first connecting portions 42 can provide greater circumferential extension and retraction capacity.

Figure 10:
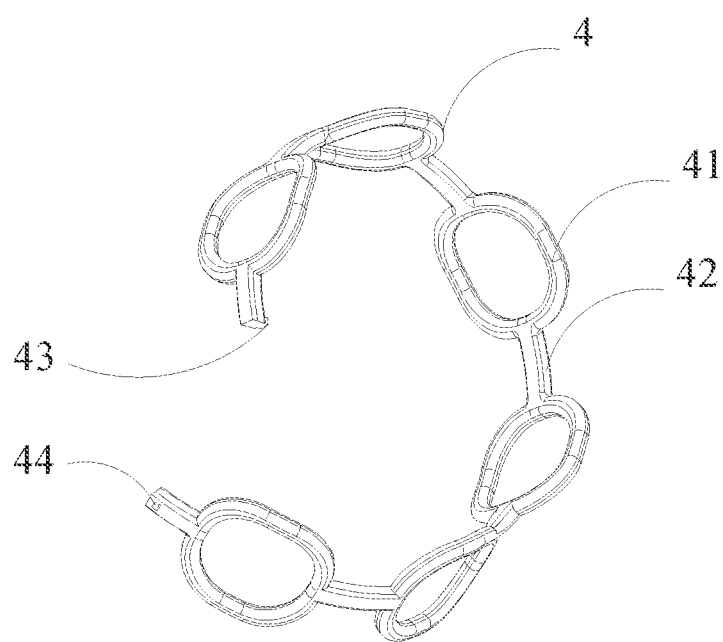
FIG. 10 is a schematic view of the first connector in a disconnection state according to the first embodiment of the present disclosure.

As shown in FIG. 10, the first connector 4 can be further provided with a connection structure, and the first connector 4 can be connected at the connection structure to surround the outer wall of the intestinal tissue 9, for example, to form a closed ring structure, or to be separated from the outer wall of the intestinal tissue 9 when two ends of the first connector 4 are disconnected at the connection structure. The first connector 4 has two states: a state having a closed circular shape or a state having an unclosed shape. The first connector 4 can be applied in two ways: one way is that the first connector 4 is initially a closed ring, and when the first connector 4 needs to be separated from the intestinal tissue 9, the connection structure is disconnected; another way is that the first connector 4 is initially an unclosed structure and after installed outside the intestinal tissue 9, the first connector 4 is connected at the connection structure to form a ring. The connection structure shown in FIG. 10 includes a connection protrusion 43 and a connection groove 44 arranged at two ends, respectively. When the connection protrusion 43 is embedded in the connection groove 44, the first connector 4 is circular. When the connection protrusion 43 separates from the connection groove 44, the first connector 4 is in a strip shape or other unclosed shapes. In other alternative embodiments, the connection structure can also be in other forms, such as a form including a connection ring and a connection hook at two ends of the first connector 4, hooking the connection ring and the connection hook together or separating them to achieve two states of the first connector 4, or a form including bonding structures at both ends to achieve two states of the first connector 4 through bonding or separation, and so on. When the first fixing members 2 need to be placed on the outer wall of intestinal tissue 9, the first connector 4 and the first fixing members 2 can be put together into the abdominal cavity as a whole. At this time, the first connector 4 is an unclosed ring or a long strip structure having two ends, and the first connector 4 surrounds the outer wall of intestinal tissue 9. After the first connector 4 is located at the desired position, connect the two ends of the first connector 4 with each other to form a closed ring having a connection structure. The connection structure can be connected through clamping, using fixing elements, or other means.

Figure 7:
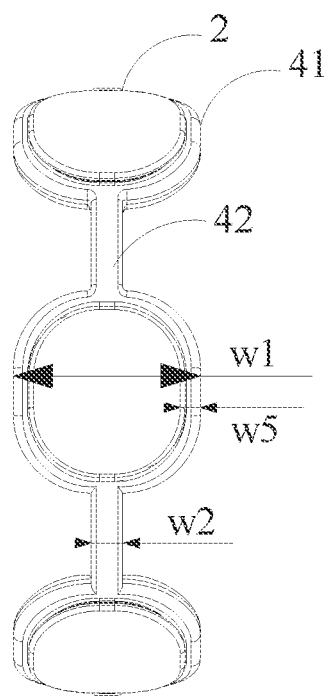
FIG. 7 is a front schematic view of the first fixing member according to the first embodiment of the present disclosure.
Figure 9:
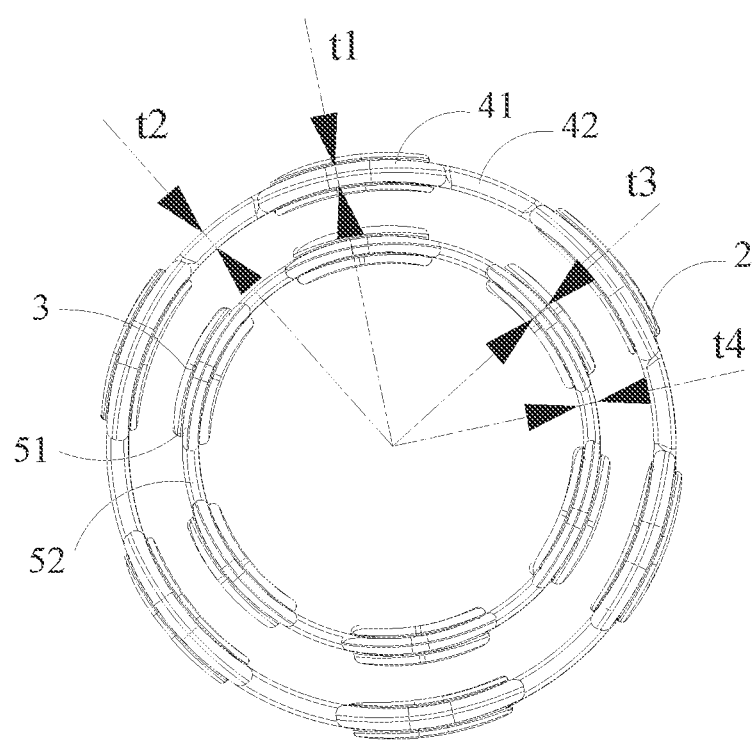
FIG. 9 is a side view of a fixing assembly according to the first embodiment of the present disclosure.

As shown in FIGS. 1 and 7, in this embodiment, a width w1 of the first accommodating portion 41 is greater than a width w2 of the first connecting portion 42. Therefore, the first accommodating portions 41 can accommodate the first fixing members 2 having a bigger width to better fix the first fixing members 2 on the protective sleeve 1. Moreover, the width of the first connecting portion 42 is smaller, which can improve elastic deformation ability of the first connecting portion 42 and greatly reduce the impact on the peristalsis of the intestinal tissue 9. Furthermore, a width w5 of the circular wall of the first accommodating portion 41 can be greater than the width w2 of the first connecting portion 42, thereby improving the connection stability between the first accommodating portions 41 and the first fixing members 2. In this embodiment, as shown in FIG. 9, a thickness t1 of the first accommodating portion 41 is substantially the same as a thickness t2 of the first connecting portion 42. In another alternative embodiment, the thickness t1 of the first accommodating portion 41 can also be greater than the thickness t2 of the first connecting portion 42. Therefore, the first accommodating portions 41 can accommodate thicker first fixing members 2, in order to better fix the first fixing members 2 on the protective sleeve 1. Moreover, the thickness of the first connecting portion 42 is relatively smaller, which can further improve the elastic deformation ability of the first connecting portions 42. The thickness here is described as referring to a radial direction of the first connector 4 after forming a circular structure (corresponding to the radial direction of the protective sleeve 1).

The first accommodating portions 41 are integrally formed with the first connecting portions 42, and the first accommodating portion 41 is a hollow circular structure surrounding the corresponding first fixing member 2, that is, an installation hole is arranged in the first accommodating portion 41, and the first fixing member 2 is embedded in the installation hole. In order to more conveniently install the first fixing members 2 on the first connector 4 and remove them from the first connector 4, side walls of the first fixing member 2 adjacent to the inner wall of the installation hole have rounded corner structures 21. In other alternative embodiments, the first accommodating portion 41 can also adopt other shapes and can be independently formed and fixedly connected with the first connecting portion 42. As shown in FIG. 5, a circumferential mounting groove 23 is arranged on at least a part of the side surfaces of the first fixing member 2, and the circular first accommodating portion 41 is embedded in the mounting groove 23. In another alternative implementation, a circumferential mounting groove is provided on at least a part of the inner edges of the hollow circular structure of the first accommodating portion 41, and the side surfaces of the first fixing member 2 are embedded in the mounting groove, thereby achieving stable connection between the first fixing member 2 and the first accommodating portion 41.

Figure 6:
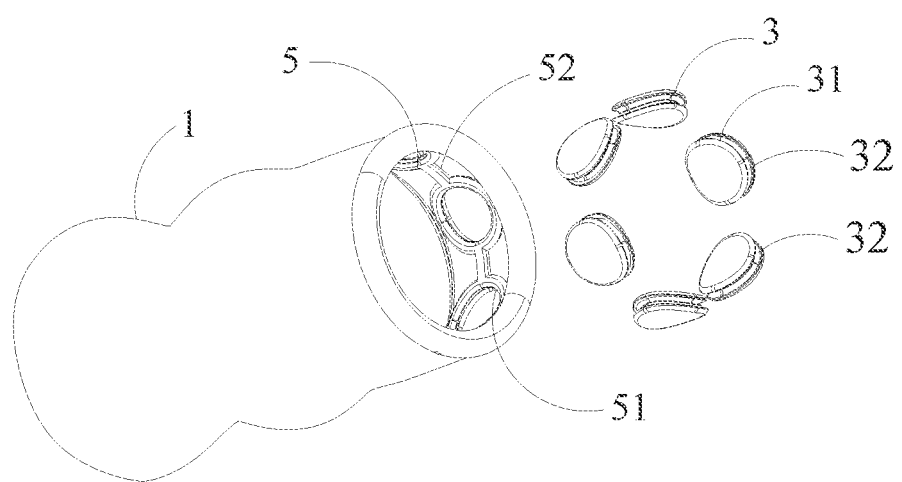
FIG. 6 is a schematic view of a cooperation between a protective sleeve and a second fixing member according to the first embodiment of the present disclosure.

As shown in FIG. 4, in this embodiment, the fixing assembly further includes a second connector 5 being configured to accommodate the second connector 3, which is located on the inner surface of the protective sleeve 1 and positioned correspondingly to the first connector 4. In this embodiment, when the second connector 5 is installed inside the intestinal tissue 9, the second connector 5 surrounds the inner surface of the protective sleeve 1, forming a connecting ring structure, thereby fixing the first fixing members 2 on the protective sleeve 1 in the circumferential direction. However, the present disclosure is not limited to this. In other alternative embodiments, the second connector 5 can also be in other non-closed shapes. The position of the second connector 5 corresponds to the position of the first connector 4, forming a fixing ring for the protective sleeve 1. As shown in FIG. 6, the second connector 5 includes a plurality of second accommodating portion 51 and a plurality of second connecting portion 52. The second accommodating portions 51 are in one-to-one correspondence to the second fixing members 3, and the second accommodating portion 51 accommodates the corresponding second fixing member 3. The second connecting portion 52 is connected between two adjacent second accommodating portions 51. When the second connector 5 is installed at the intestinal tissue 9, the circumference of the second connector 5 is adjustable. Furthermore, the second connector 5 can be an elastic connector, and at least the second connecting portions 52 are elastic. Therefore, during intestinal peristalsis, the second connector 5 can be elastically deformed with the intestinal peristalsis, without applying limiting pressure on the intestine, providing an extension and retraction space for the intestine. For example, the second connector 5 can be an elastic connector with a certain elasticity made of materials such as rubber, silicone, etc. The second connector 5 can be arranged parallel to the support portion 11. The second connector 5 can be a closed circular structure. Or the second connector 5 can be a connector with a connection structure, two ends of the second connector 5 are connected to form a connecting ring when installed in the intestinal tissue 9. When both the second connecting portions 52 and the second accommodating portions 51 are elastic, an elasticity of the second accommodating portions 51 can be less than an elasticity of the second connecting portions 52. Thus, the second accommodating portions 51 can better fix the second fixing members 3, and the second connecting portions 52 can provide greater circumferential extension and retraction capacity.

Figure 8:
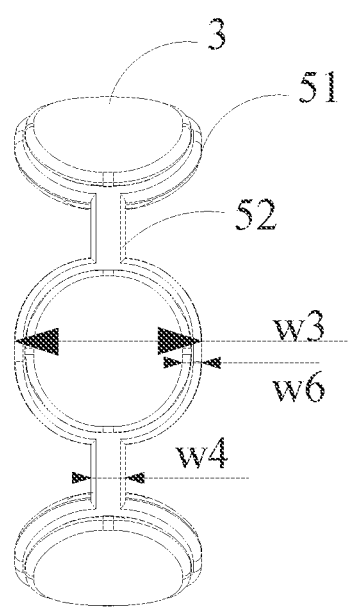
FIG. 8 is a front schematic view of the second fixing member according to the first embodiment of the present disclosure.

As shown in FIG. 8, in this embodiment, a width w3 of the second accommodating portion 51 is greater than a width w4 of the second connecting portion 52. The width here is described in the width direction of the first accommodating portion 41 shown in FIG. 1. Therefore, the second accommodating portions 51 can accommodate bigger second fixing members 3 to better fix the protective sleeve 1. Moreover, the width of the second connecting portion 52 is smaller, which can improve elastic deformation ability of the second connecting portions 52 and greatly reduce the impact on the peristaltic of the intestinal tissue 9. Furthermore, a width w6 of the circular wall of the second accommodating portion 51 can be greater than the width w4 of the second connecting portion 52, thereby improving connection stability between the second accommodating portions 51 and the second fixing members 3. In this embodiment, as shown in FIG. 9, a thickness t3 of the second accommodating portion 51 is substantially the same as a thickness t4 of the second connecting portion 52. In another alternative embodiment, the thickness t3 of the second accommodating portion 51 can also be greater than the thickness t4 of the second connecting portion 52. Therefore, the second accommodating portions 51 can accommodate thicker second fixing members 3, in order to better fix the second fixing members 3 on the protective sleeve 1. Moreover, the thickness of the second connecting portion 52 is relatively smaller, which can further improve the elastic deformation ability of the second connecting portions 52.

The second accommodating portions 51 are integrally formed with the second connecting portion 52, and the second accommodating portion 51 is a hollow circular structure surrounding the corresponding second fixing member 3, that is, an installation hole is provided in the second accommodating portion 51, and the second fixing member 3 is embedded in the installation hole. In order to more conveniently install the second fixing members 3 on the second connector 5 and remove them from the second connector 5, side walls adjacent to the inner wall of the installation hole of the second fixing member 3 have rounded corner structures 31. In other alternative embodiments, the second accommodating portion 51 can also adopt other shapes and can be independently formed and fixedly connected with the second connecting portion 52. As shown in FIG. 6, a circumferential mounting groove 32 is provided on at least a part of side surfaces of the second fixing member 3, and the circular second accommodating portion 51 is embedded in the mounting groove 32. In another alternative implementation, a circumferential mounting groove is provided on at least a part of the inner edges of the hollow circular structure of the second accommodating portion 51, and the side surfaces of the second fixing member 3 are embedded in the mounting groove, thereby achieving stable connection between the second fixing members 3 and the second accommodating portion 51.

In this embodiment, the second connector 5 can also be integrally formed with the protective sleeve 1. In an alternative implementation, the second connector 5 can also be formed separately from the protective sleeve 1 and fixed to the protective sleeve 1 by adhesive or other means. In another alternative implementation, the second connector 5 can also be placed in the corresponding position of the protective sleeve 1 by a doctor during surgery, rather than being fixed in advance in the protective sleeve 1.

Figure 11:
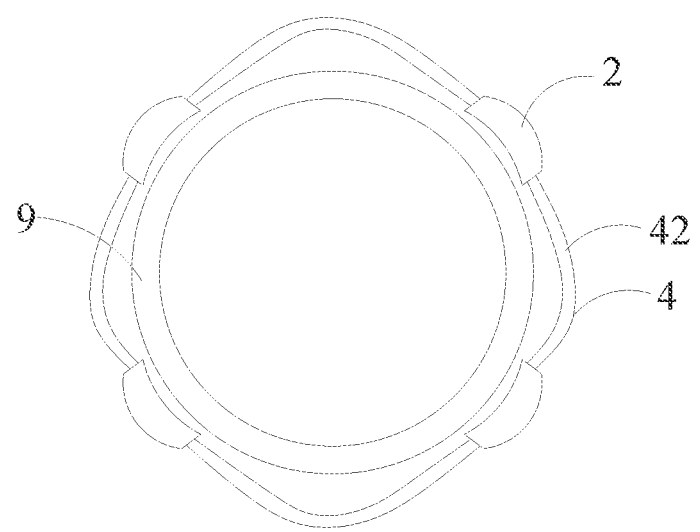
FIG. 11 is a structural schematic view of a flexible first connector according to the first embodiment of the present disclosure.

As shown in FIG. 11, in an alternative embodiment of this embodiment, the first connector 4 may be non-elastic, but only flexible with a certain redundant length in the circumferential direction. The diameter of the first connector 4 before being placed on the intestine is greater than the outer diameter of the intestine. During intestinal peristalsis, the redundant length of the first connector 4 makes the diameter of the first connector 4 adjustable, to reduce impact on normal intestinal peristalsis and ensure normal blood supply around the anastomotic stoma. In another alternative embodiment, the second connector 5 may be non-elastic, but only flexible and has a shape similar to the shape of the first connector 4 in FIG. 11, with a certain redundant length in the circumferential direction.

Figure 12:
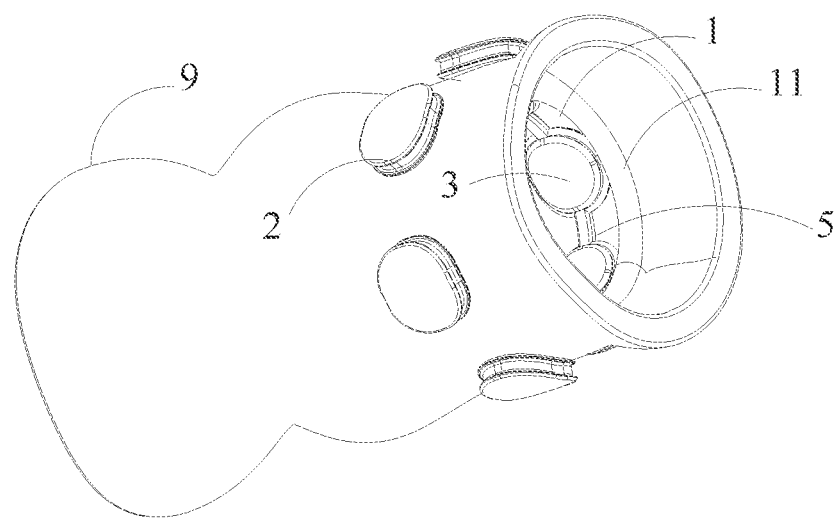
FIG. 12 is a three-dimensional view of an anastomosis protection device applied to the intestine according to a second embodiment of the present disclosure.

FIG. 12 is a three-dimensional view of an anastomosis protection device applied to the intestine according to a second embodiment of the present disclosure. In this embodiment, there is no first connector on the outer wall of the intestinal tissue 9, while a plurality of first fixing members 2 that are separated from each other are provided. During surgery, the first fixing members 2 can be placed one by one at positions corresponding to the second fixing members 3, to fix the first fixing members 2 to the second fixing members 3. Compared to the first embodiment, the second embodiment omits the first connector and the device has fewer components. At the positions without arranging the first fixing members 2, the device will not apply any pressure on the tissue, which will not affect the normal blood supply around the anastomotic stoma. And during the peristalsis of intestinal tissue 9, a circumferential distance between adjacent first fixing members 2 can freely increase or decrease with the peristalsis of intestinal tissue 9, which also provides circumferential extension and retraction space for intestinal tissue 9.

In this embodiment, at least one or more of the first fixing members 2 can use bioabsorbable materials, such as bioabsorbable iron-based materials, and the second fixing members 3 can use magnetic materials to attract the first fixing members 2. In addition, the first fixing members 2 can also use magnetized bioabsorbable iron-based materials, and the second fixing members 3 can use magnetic materials or non-magnetic materials that can be attracted by magnets. After the anastomosis protection device is installed on the intestine, the first fixing members 2 can gradually be absorbed by human body without a need for subsequent removal, omitting the step of detaching the first fixing members 2 after surgery. The second fixing members 3 can be fixedly connected to the protective sleeve 1. After the anastomotic stoma is healed, the protective sleeve 1 and the second fixing members 3 can be detached together, making the surgical operation more convenient.

In other alternative embodiments, at least some of the second fixing members 3 can also use bioabsorbable materials, such as bioabsorbable iron-based materials or magnetized bioabsorbable iron-based materials, thereby omitting the step of detaching the second fixing members 3 after surgery.

Furthermore, the second connector 5 can also be partially or entirely made of bioabsorbable materials, such as bioabsorbable medical films, which have flexibility or elasticity while ensuring certain strength, thereby omitting the step of removing the second connector 5 after surgery. In the first embodiment mentioned above, the first connector 4 can also be made of bioabsorbable materials, such as bioabsorbable medical films, which have flexibility or elasticity while ensuring certain strength, thereby omitting the step of removing the first connector 4 after surgery.

In other embodiments of the present disclosure, one or more of the first fixing members 2, the second fixing members 3, the first connector 4, and the second connector 5 may also be at least partially made of bioabsorbable materials, which can be naturally absorbed in the human body after a period of time without the need for manual detachment after surgery. In the case where the first fixing members 2 are magnetic members, the first fixing members 2 can also be bioabsorbable magnetic. In the case where the second fixing members 3 are magnetic members, the second fixing members 3 can also be bioabsorbable.

Figure 13:
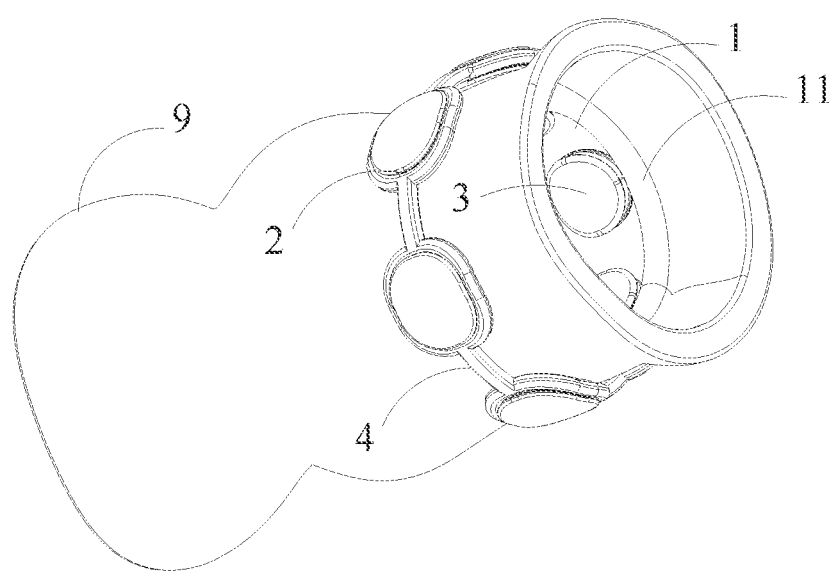
FIG. 13 is a three-dimensional view of an anastomosis protection device applied to the intestine according to a third embodiment of the present disclosure.

FIG. 13 is a three-dimensional view of an anastomosis protection device applied to the intestine according to a third embodiment of the present disclosure. In this embodiment, there is no second connector in the protective sleeve 1, and a plurality of second fixing members 3 that are separated from each other are provided. During surgery, the second fixing members 3 can be placed one by one at positions corresponding to the first fixing members 2, to fix the first fixing members 2 to the second fixing members 3. Compared to the first embodiment, the second embodiment omits the second connector and the device has fewer components. At the positions without arranging the second fixing members 3, the device will not apply any pressure on the tissue, which will not affect the normal blood supply around the anastomotic stoma. And during the peristalsis of intestinal tissue 9, a circumferential distance between adjacent second fixing members 3 can freely increase or decrease with the peristalsis of intestinal tissue 9, which also provides a circumferential extension and retraction space for intestinal tissue 9.

Figure 14:
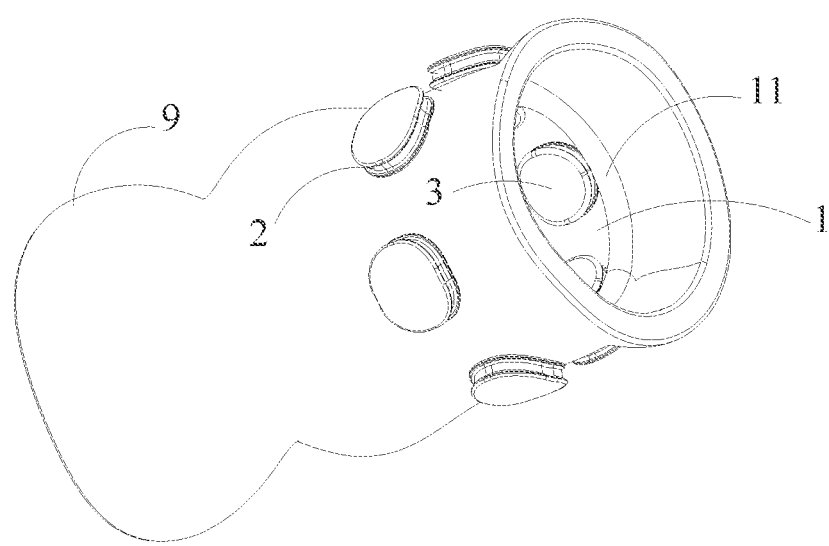
FIG. 14 is a three-dimensional view of an anastomosis protection device applied to the intestine according to a fourth embodiment of the present disclosure.

FIG. 14 is a three-dimensional view of an anastomosis protection device applied to the intestine according to a fourth embodiment of the present disclosure. In this embodiment, there is no first connector on the outer wall of the intestinal tissue 9, and there is no second connector in the protective sleeve 1. During surgery, the first fixing members 2 and the second fixing members 3 can be placed in the desired positions correspondingly. Therefore, in this embodiment, the device only includes a protective sleeve, a plurality of first fixing members 2, and a plurality of second fixing members 3. The second fixing members 3 can be pre-installed in the protective sleeve 1 before surgery, facilitating the alignment between the first fixing members 2 and the second fixing members 3 during the surgery process. In addition, the second fixing members 3 can also be placed in the desired position during the surgery without being pre-installed in the protective sleeve 1.

Figure 15:
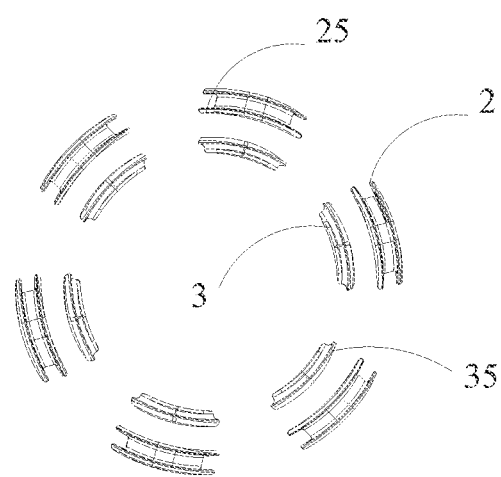
FIG. 15 is a side view of the anastomosis protection device according to the fourth embodiment of the present disclosure.

As shown in FIG. 15, the first fixing member 2 includes an inner surface 25 facing the intestinal tissue 9, and the inner surface 25 of the first fixing member 2 attaches to the outer wall of the intestinal tissue 9. The second fixing member 3 includes an outer surface 35 facing the protective sleeve 1, and the outer surface 35 of the second fixing member 3 attaches to the inner surface of the protective sleeve 1. In order to achieve better mutual positioning and more stable connection between the first fixing member 2 and the second fixing member 3, the shape of the inner surface 25 of the first fixing member 2 matches the shape of the outer surface 35 of the second fixing member 3, thereby forming a good fit between the inner surface 25 and the corresponding outer surface 35, while they are separated by the intestinal wall and the protective sleeve 1. As shown in FIG. 15, in this embodiment, the inner surface 25 of the first fixing member 2 and the outer surface 35 of the second fixing member 3 are arc-shaped surfaces adapted to the shape of the outer wall of the intestinal tissue 9, respectively, and can achieve better attachment between the inner surface 25 of the first fixing member 2 and the outer wall of the intestinal tissue 9, as well as better attachment between the outer surface 35 of the second fixing member 3 and the inner surface of the protective sleeve 1.

Figure 16:
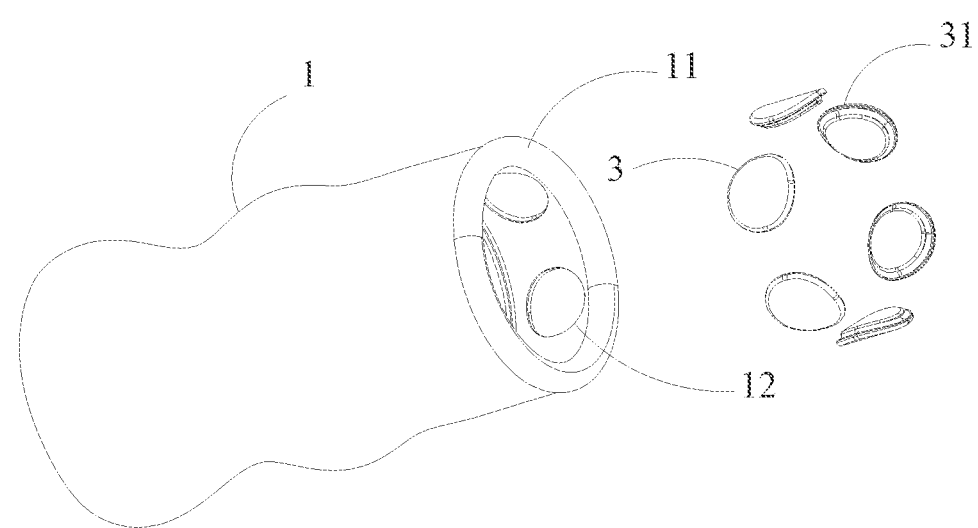
FIG. 16 is a schematic view of an inner surface of a protective sleeve provided with recesses according to the fourth embodiment of the present disclosure.
Figure 17:
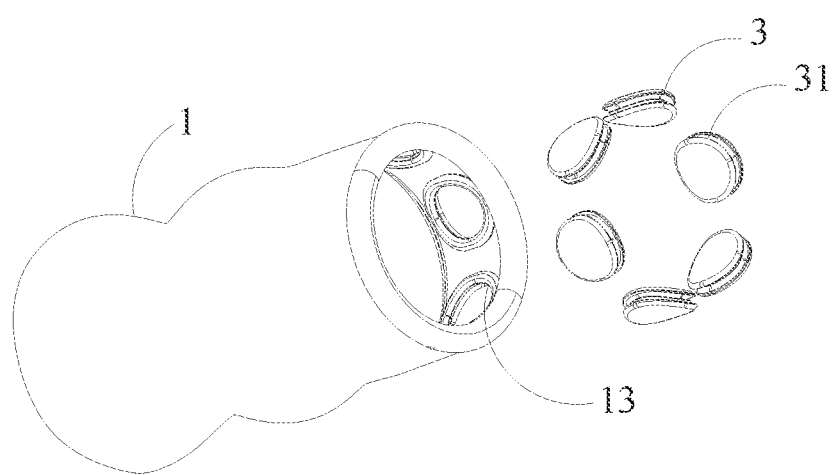
FIG. 17 is a schematic view of the inner surface of the protective sleeve provided with a plurality of circular mounting members according to the fourth embodiment of the present disclosure.

As shown in FIGS. 16 and 17, in the fourth embodiment, a plurality of mounting grooves corresponding to the second fixing members 3 can be further provided on the inner surface of the protective sleeve 1 to better position the second fixing members 3 on the inner surface of the protective sleeve 1. The second fixing member 3 is embedded in the corresponding mounting groove, therefore the second fixing members 3 are detachably mounted on the inner surface of the protective sleeve 1. FIGS. 16 and 17 show two different kinds of mounting grooves. The mounting grooves in FIG. 16 are recesses 12 designed on the inner surface of the protective sleeve 1, and the mounting grooves in FIG. 17 are grooves formed by a circular mounting member 13 protruding from the inner surface of the protective sleeve 1. The second fixing members 3 can be pre-embedded into the mounting groove on the inner surface of the protective sleeve 1 before surgery, and then the protective sleeve 1 and the second fixing members 3 can be placed inside the intestinal tissue 9 together. It is also possible to embedding the second fixing members 3 in the corresponding mounting grooves during the surgery without installing the second fixing members 3 in advance. The mounting grooves in FIGS. 16 and 17 can also be applied to the third embodiment shown in FIG. 13. As shown in FIG. 16, to facilitate the installation of the second fixing members 3 in the recesses 12, the protective sleeve 1 is elastic at least at the position of the recesses 12. Furthermore, the protective sleeve 1 can also be wholly elastic. The shape of the recesses 12 is adapted to the shape of the second fixing members 3, and each side of the second fixing members 3 have rounded corner to make the installation and removal of the second fixing members 3 in the recesses 12 smoother. As shown in FIG. 17, the circular mounting components 13 are fixedly connected or integrally formed with the protective sleeve 1. The circular mounting members 13 are elastic to facilitate the installation of the second fixing members 3 into the circular mounting members 13. The protective sleeve 1 and the circular mounting members 13 can also be elastic as a whole. The circular mounting member 13 is a hollow circular structure, and the shape of the hollow part of the circular mounting member 13 is adapted to the shape of the second fixing member 3. The second fixing members 3 can be pre-embedded in the circular mounting members 13 on the inner surface of the protective sleeve 1 before surgery, and then the entire protective sleeve 1 and the second fixing members 3 can be placed inside the intestinal tissue 9. It is also possible to embed the second fixing members 3 in the corresponding circular mounting members 13 during surgery without installing the second fixing members 3 in advance.

Figure 18:
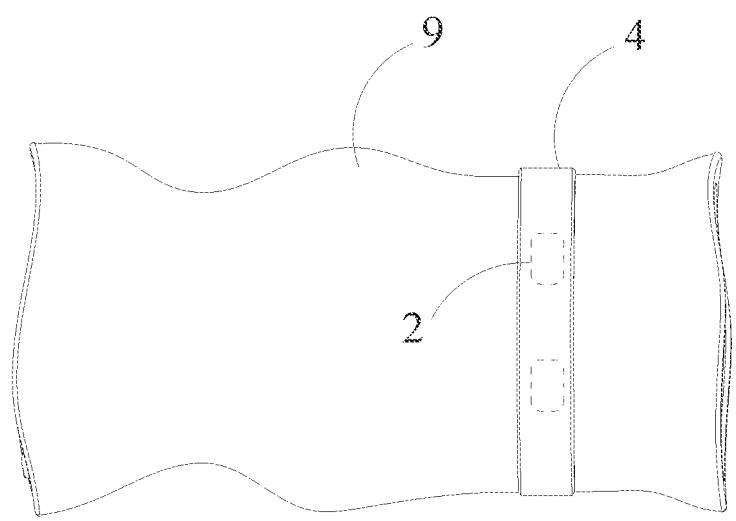
FIGS. 18 and 19 are schematic views of an anastomosis protection device applied to the intestine according to a fifth embodiment of the present disclosure.
Figure 19:
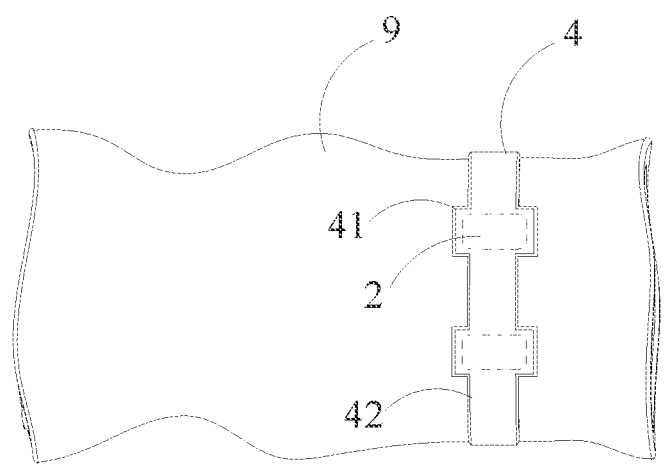

FIGS. 18 and 19 are schematic views of the anastomosis protection device applied to the intestine according to the fifth embodiment of the present disclosure. In this embodiment, the first fixing members 2 are embedded in and inseparable from the first connector 4. In the embodiment of FIG. 18, a width of the first accommodating portion which accommodates the first fixing member 2 is the same as a width of the first connecting portion of the first connector 4. The entire first connector 4 forms a magnetic ring with a uniform width. The first connector 4 can be an elastic ring made of materials such as rubber and silicone. Therefore, the first connector 4 can form a strip structure as a whole, which can be stored more conveniently.

Similarly, the second connector 5 can also adopt a structure similar to the first connector 4. A width of the second accommodating portion which accommodates the second fixing member 3 is the same as a width of the second connecting portion of the first connector 4. The second fixing members 3 can also be embedded in the second connector 5 in a similar way, forming an integral magnetic ring that the second fixing member 3 cannot be separated. Therefore, the second connector 5 can form a strip structure, which can be stored more conveniently.

In the embodiment of FIG. 19, the first fixing members 2 are embedded in and inseparable from the first elastic connector 4. A width of the first accommodating portion 41 which accommodates the first fixing members 2 is adapted to a width of the first fixing member 2, and the width of the first accommodating portion 41 is greater than a width of the first connecting portion 42. The entire first elastic connector 4 forms a magnetic ring with a uniform width when installed at the position of the anastomotic stoma. The first elastic connector 4 can be an elastic ring made of materials such as rubber and silicone. Therefore, the first elastic connector 4 can form a strip structure as a whole, which can be stored more conveniently.

Similarly, the second elastic connector 5 can also adopt a structure similar to the first elastic connector 4. A width of the second accommodating portion which accommodates the second fixing member 3 is greater than a width of the second connecting portion. The second fixing member 3 can also be embedded in the second elastic connector 5 in a similar way, forming an integral magnetic ring that cannot be separated by the second fixing member 3. Therefore, the second elastic connector 5 can form a strip structure, which can be stored more conveniently.

Figure 20:
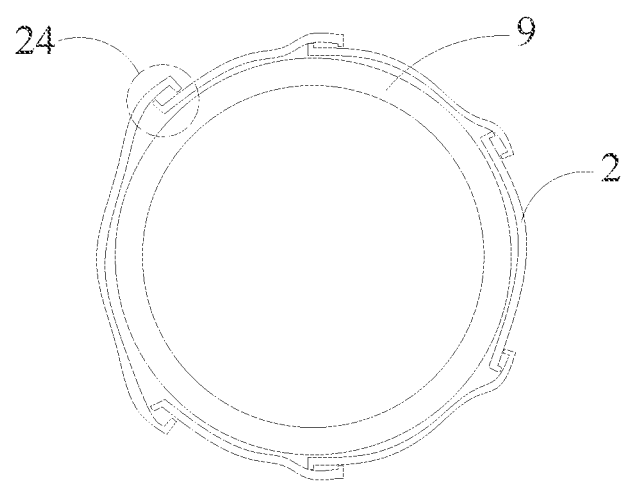
FIG. 20 is a structural schematic view of a plurality of first fixing members connected end-to-end according to a sixth embodiment of the present disclosure.

FIG. 20 is a structural schematic view of a plurality of first fixing members connected end-to-end according to a sixth embodiment of the present disclosure. In this embodiment, the outer wall of the intestinal tissue 9 is provided with a plurality of first fixing members 2, and a side surface of the first fixing member 2 facing the intestinal tissue 9 is arc-shaped. A plurality of first fixing members 2 are connected end-to-end to form a circular structure. And to provide a circumferential extension and retraction space for intestinal tissue 9, a circumferential adjustable cooperating structure 24 is formed at the connecting position between two adjacent first fixing members 2, thereby achieving circumferential extension and retraction. The first fixing members 2 can be partially magnetic or partially attracted by magnets, that is, the first fixing members are only partially attracted to the second fixing members 3, thereby avoiding impact on intestinal peristalsis.

In other alternative embodiments, the second fixing members 3 can also adopt a structure similar to the first fixing members 2 in FIG. 20, wherein a plurality of second fixing members 3 are connected end-to-end to form a fixing ring, and a circumferential adjustable connection structure is formed at the connecting position of two adjacent second fixing members 3, thereby achieving circumferential extension and retraction space. The second fixing members 3 can be partially magnetic or partially attracted by magnets, that is, the second fixing members 3 are only partially attracted to the first fixing members 2, thereby avoiding impact on intestinal peristalsis.

The anastomosis protection device of the first to sixth embodiments mentioned above can be used to protect an anastomotic stoma at a low position in the intestine, as well as to protect an anastomotic stoma at a high position in the intestine. When protecting the anastomotic stoma at a high position in the intestine, if the protective sleeve 1 extends to an abdominal wall, the protective sleeve 1 needs to be very long, which is very inconvenient to install and use. Therefore, in this case, a shorter protective sleeve 1 can be used to only protect the anastomotic position. In this embodiment, the device includes two fixing assemblies, one is located on an upstream side of the anastomotic stoma and the other one is located on a downstream side of the anastomotic stoma.

Figure 21:
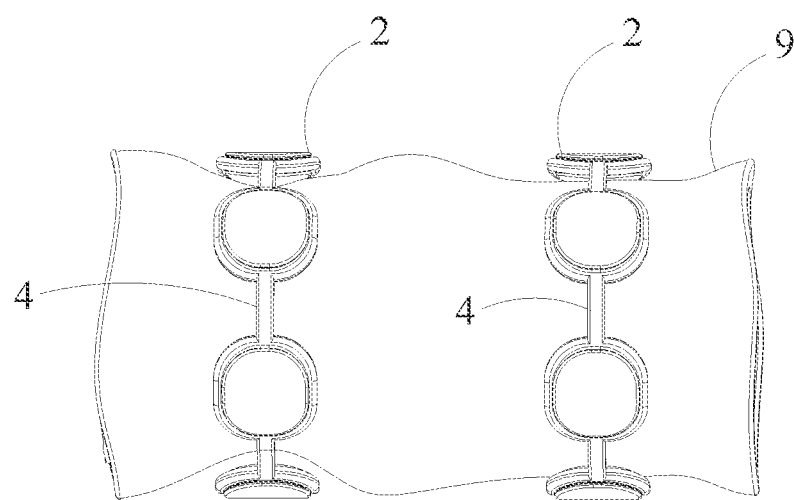
FIG. 21 is a three-dimensional view of an anastomosis protection device applied to the intestine according to a seventh embodiment of the present disclosure.

FIG. 21 is a three-dimensional view of an anastomosis protection device applied to the intestine according to a seventh embodiment of the present disclosure. In this embodiment, the anastomosis protection device is used to protect the anastomotic stoma at a high position in the intestine. On the outer wall of the intestinal tissue 9 at the upstream side of the anastomotic stoma, a set of first connector 4 and first fixing members 2 is provided, and second fixing members are correspondingly provided inside the protective sleeve 1. On the outer wall of the intestinal tissue 9 at the downstream side of the anastomotic stoma, another set of first connector 4 and first fixing members 2 is provided, and second fixing members are correspondingly provided inside the protective sleeve 1. This structure can greatly reduce the required length of the protective sleeve 1 and facilitate the placement of the protective sleeve 1 during surgery and the removal of the protective sleeve 1 after the anastomotic stoma is healed. On the other hand, it can better fix the protective sleeve 1 in the required position, ensuring stability during use.

Figure 22:
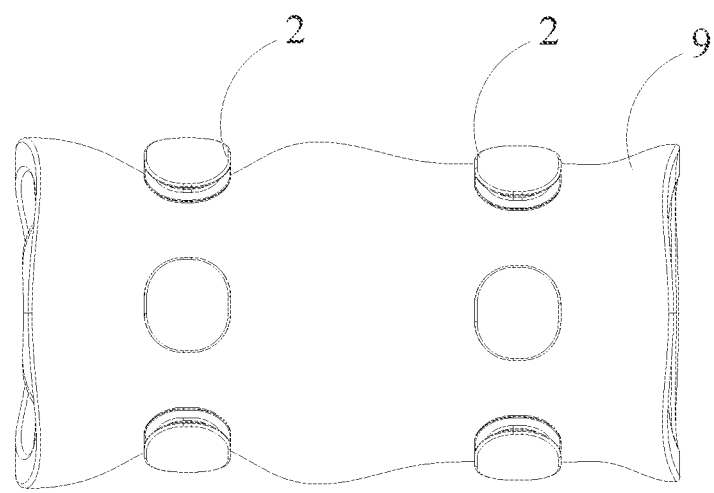
FIG. 22 is a three-dimensional view of an anastomosis protection device applied to the intestine according to an eighth embodiment of the present disclosure.

FIG. 22 is a three-dimensional view of an anastomosis protection device applied to the intestine according to an eighth embodiment of the present disclosure. In this embodiment, the anastomosis protection device can also be used for the protection of anastomotic stoma at a high position in the intestine. On the outer wall of intestinal tissue 9 at the upstream side of the anastomotic stoma, there is a set of first fixing members 2, and second fixing members 3 are correspondingly provided inside the protective sleeve 1. On the outer wall of intestinal tissue 9 at the downstream side of the anastomotic stoma, there is another set of first fixing members 2, and second fixing members are correspondingly provided inside the protective sleeve 1.

In addition, the other structures and various combinations of the fixing assemblies in the first to sixth embodiments mentioned above can also be applied to protect the anastomotic stoma at a high position in the intestine, and two fixing assemblies can be provided separately, at the upstream side and the downstream side of the anastomotic stoma.

Figure 23:
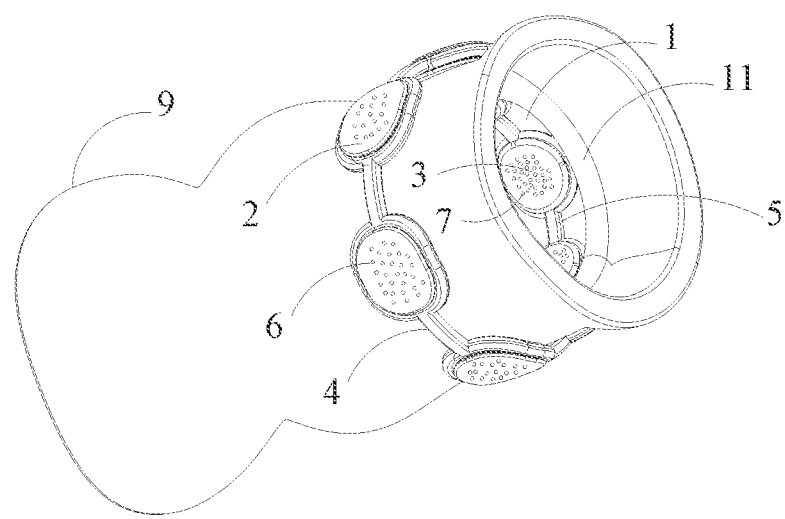
FIG. 23 is a three-dimensional view of an anastomosis protection device applied to the intestine according to a ninth embodiment of the present disclosure.
Figure 24:
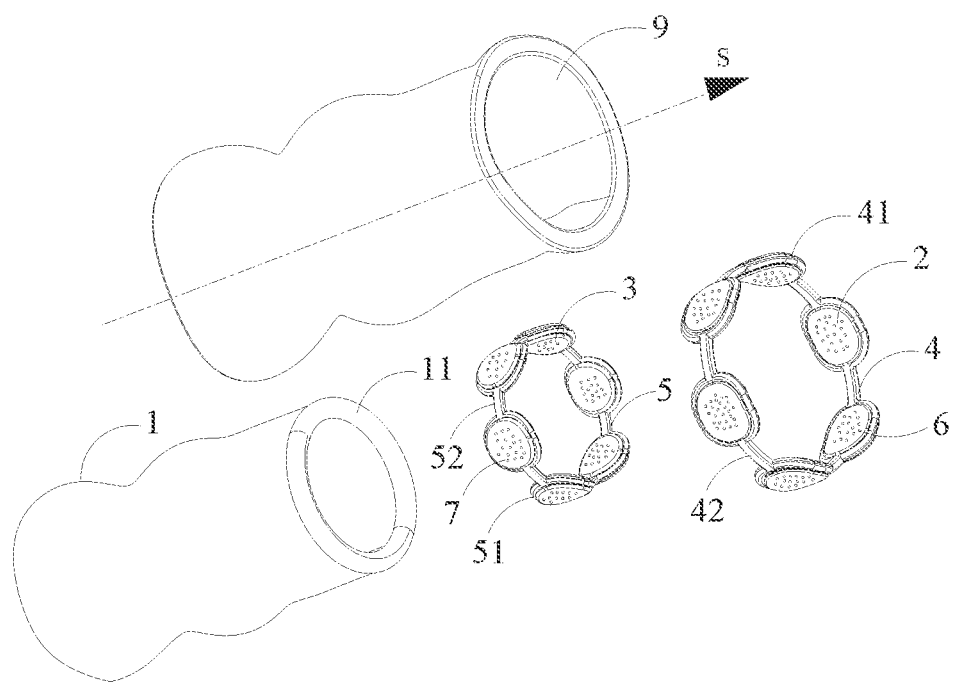
FIG. 24 is an exploded view of the anastomosis protection device according to the ninth embodiment of the present disclosure.

FIGS. 23 and 24 are structural schematic views of the anastomosis protection device according to a ninth embodiment of the present disclosure. This embodiment is similar to the first embodiment, and the anastomosis protection device includes: a protective sleeve 1 located inside the intestinal tissue 9 and positioned correspondingly to the anastomotic stoma, which protects the inner surface of the anastomotic stoma, so that the contents won't contaminate the anastomotic stoma when the protective sleeve guides the contents to pass through the intestine; a plurality of first fixing members 2 provided on the outer wall of the intestinal tissue 9; and a plurality of second fixing members 3 provided on the inner surface of the protective sleeve 1, wherein the second fixing members 3 are positioned correspondingly to the first fixing member 2.

The difference between the ninth embodiment and the first embodiment is that the first fixing members 2 have external magnetic particles 6, and the second fixing member 3 have internal magnetic particles 7. The external magnetic particles 6 in the first fixing members 2 have a same magnetic polarity, the internal magnetic particles 7 in the second fixing members 3 have a same magnetic polarity, and the magnetic polarity of the external magnetic particles in the first fixing members 2 is opposite to the magnetic polarity of the internal magnetic particles in the second fixing members 3.

The external magnetic particles 6 can be coated on a surface of the first fixing member 2 as a first magnetic particle coating, for example, on an inner surface of the first fixing member 2 facing the intestinal tissue 9. Magnetic particles can be mixed with adhesives, solvents, or other materials to form a magnetic particle coating, which can be coated on a surface of a plastic or metal substrate. The external magnetic particles 6 can also be doped in the first fixing members 2. The internal magnetic particles 7 can be coated on a surface of the second fixing member 3 as a second magnetic particle coating, for example, on an outer surface of the second fixing member 3 facing the protective sleeve 1. Magnetic particles can be mixed with adhesives, solvents, or other materials to form a magnetic particle coating, which can be coated on a surface of a plastic or metal substrate. The internal magnetic particles 7 can also be doped in the second fixing members 3. The size and distribution of magnetic particles in various views of the present disclosure are only examples. In practical applications, the size of magnetic particles used can be larger or smaller than the examples shown in the drawings. The magnetic particles can be uniformly or non-uniformly distributed, both of which fall within the protection scope of the present disclosure. Therefore, in this embodiment, magnetic particles are distributed in the first fixing member 2 and the second fixing member 3, and they are relatively fixed by means of magnetic attraction, thereby fixing the protective sleeve 1 at the desired position. In this device, only the magnetic attraction positions between the first fixing members 2 and the second fixing members 3 are relatively fixed, and the circumferential length can be elastically increased or decreased, providing a sufficient circumferential extension and retraction space for the tissue. During the peristalsis of contents inside the tissue or the tissue itself, the device ensures normal blood supply around the anastomotic stoma.

In this embodiment, the anastomosis protection device further includes a first connector 4 and a second connector 5. The structures of the first connector 4 and the second connector 5, the first fixing members 2 and the second fixing members 3 are the same as those structures of the first embodiment, and will not be repeated here. The first fixing members 2 and/or the second fixing members 3 can be made of bioabsorbable magnetic materials. The first connector 4 and/or the second connector 5 can be made of bioabsorbable magnetic materials.

Figure 25:
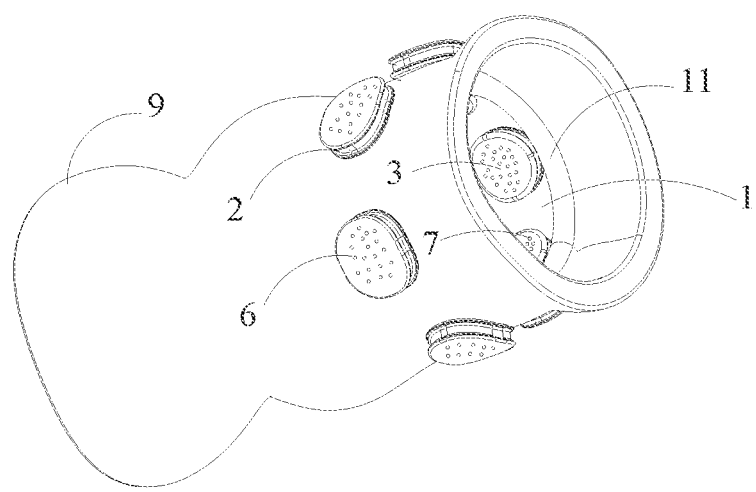
FIG. 25 is a three-dimensional view of an anastomosis protection device applied to the intestine according to a tenth embodiment of the present disclosure.

FIG. 25 is a three-dimensional view of an anastomosis protection device applied to the intestine according to a tenth embodiment of the present disclosure. The difference between this embodiment and the ninth embodiment is that there is no first connector, and the first fixing members 2 are provided at intervals and independent of each other. There is no second connector, and the second fixing members 3 are provided at intervals and independent of each other. The second fixing members 3 are positioned correspondingly to the positions of the first fixing members 2. The second fixing members 3 have internal magnetic particle particles 7 and the first fixing members have external magnetic particles 6. During surgery, the second fixing members 3 can be fixed on the inner surface of the protective sleeve 1 firstly, and then the first fixing members 2 can be placed one by one at the positions corresponding to the second fixing members 3 to fix the first fixing members 2 to the second fixing members 3. Compared to the ninth embodiment, the first connector is omitted and the device has fewer components. At the positions without arranging the first components 2, the device will not apply any pressure on the tissue, which will not affect the normal blood supply around the anastomotic stoma. And during the peristalsis of intestinal tissue 9, a circumferential distance between adjacent first fixing members 2 can freely increase or decrease with the peristalsis of intestinal tissue 9, which also provides a circumferential extension and retraction space for intestinal tissue 9.

In this embodiment, the cooperating method between the second fixing members 3 and the inner surface of the protective sleeve 1 can be the same as the cooperating method in the fourth embodiment mentioned above, that is, recesses or circular mounting members for installing the second fixing members 3 are provided on the inner surface of the protective sleeve 1, which will not be repeated here.

In another alternative embodiment of the tenth embodiment, the first fixing members 2 and the first connector 4 can also be provided outside the tubular tissue 9, while only the second fixing members 3 are provided in the protective sleeve 1, without providing a second connector. In another alternative implementation, the first fixing members 2 can also be provided outside the tubular tissue, without providing a first connector, while the second fixing member 3 and the second connector 5 can be provided inside the protective sleeve 1.

Figure 26:
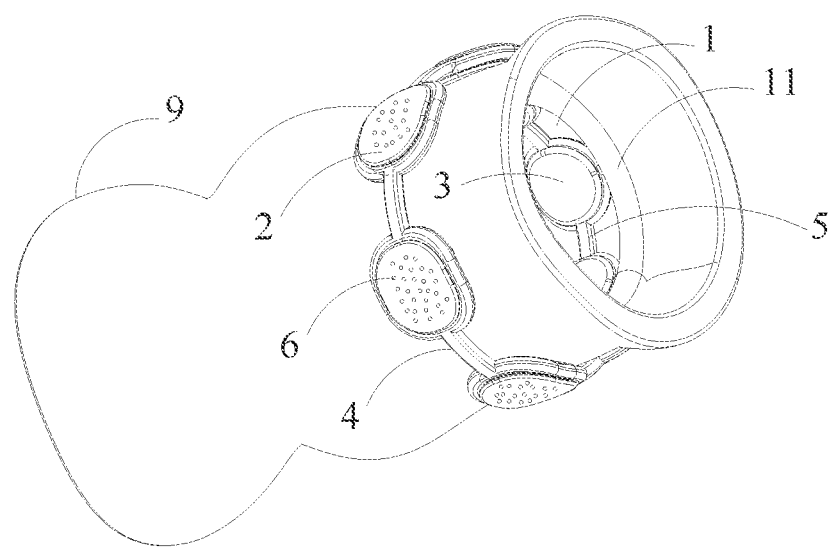
FIG. 26 is a schematic view of an anastomosis protection device applied to the intestine according to an eleventh embodiment of the present disclosure.

FIG. 26 is a schematic view of an anastomosis protection device applied to the intestine according to an eleventh embodiment of the present disclosure. The difference between this embodiment and the ninth embodiment is that only the first fixing members 2 have external magnetic particles 6. The second fixing members 3 can use non-magnetic materials that can be attracted by magnets, such as iron, nickel, cobalt or other metals and their alloys. The second fixing members 3 can also use magnetic materials, such as magnets having a magnetic polarity opposite to a magnetic polarity of the external magnetic particles 6 of the first fixing member 2. It can also achieve magnetic attraction between the first fixing members 2 and the second fixing members 3, thereby fixing the protective sleeve 1 at the desired position.

Figure 27:
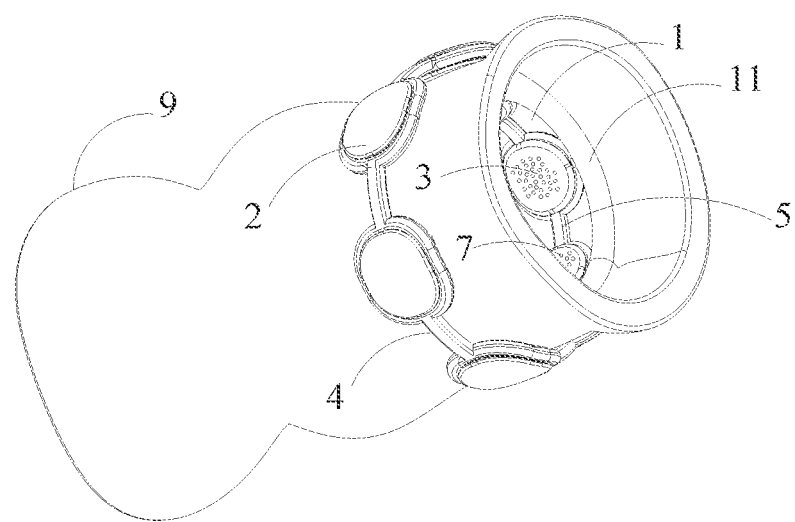
FIG. 27 is a schematic view of an anastomosis protection device applied to the intestine according to a twelfth embodiment of the present disclosure.

FIG. 27 is a schematic view of an anastomosis protection device applied to the intestine according to a twelfth embodiment of the present disclosure. The difference between this embodiment and the ninth embodiment is that only the second fixing members 3 have internal magnetic particles 7. The first fixing member 2 can use non-magnetic materials that can be attracted by magnets, such as iron, nickel, cobalt or other metals and their alloys. The first fixing member 2 can also use magnetic materials, such as magnets having a magnetic polarity opposite to a magnetic polarity of the magnetic particles 7 inside the second fixing member 3. It can also achieve magnetic attraction between the first fixing members 2 and the second fixing members 3, thereby fixing the protective sleeve 1 at the desired position.

Figure 28:
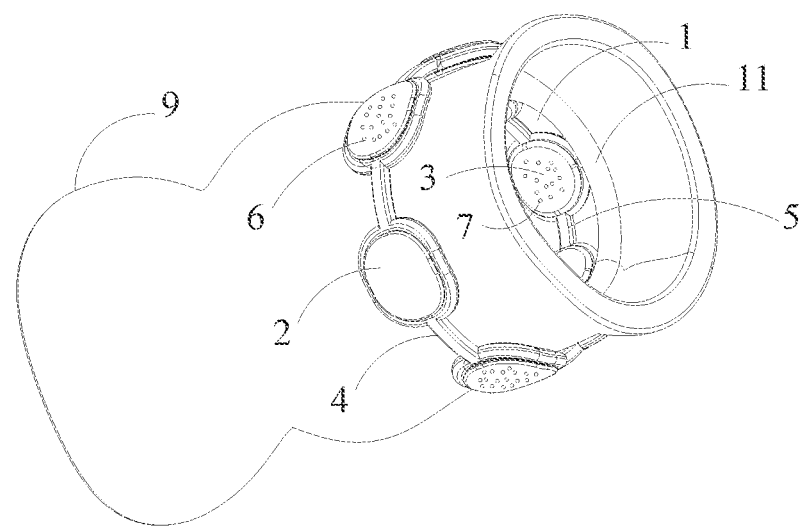
FIG. 28 is a schematic view of an anastomosis protection device applied to the intestine according to a thirteenth embodiment of the present disclosure.

FIG. 28 is a schematic view of an anastomosis protection device applied to the intestine according to a thirteenth embodiment of the present disclosure. The difference between the thirteenth embodiment and the ninth embodiment is that some of the first fixing members 2 have magnetic particles, while the first fixing members 2 without magnetic particles can be made of non-magnetic materials that can be attracted by magnets, such as iron, nickel, cobalt or other metals and their alloys, or magnetic materials, such as magnets. Similarly, some of the second fixed members 3 have magnetic particles, while the second fixed parts 3 without magnetic particles can be made of non-magnetic materials that can be attracted by magnets, such as iron, nickel, cobalt or other metals and their alloys, or magnetic materials, such as magnets. The first fixing member 2 and the corresponding second fixing member 3 form a pair of fixing members, and in each pair of fixing members, at least one fixing member (the first fixing member 2 and/or the second fixing member 3) is a magnetic member.

Figure 29:
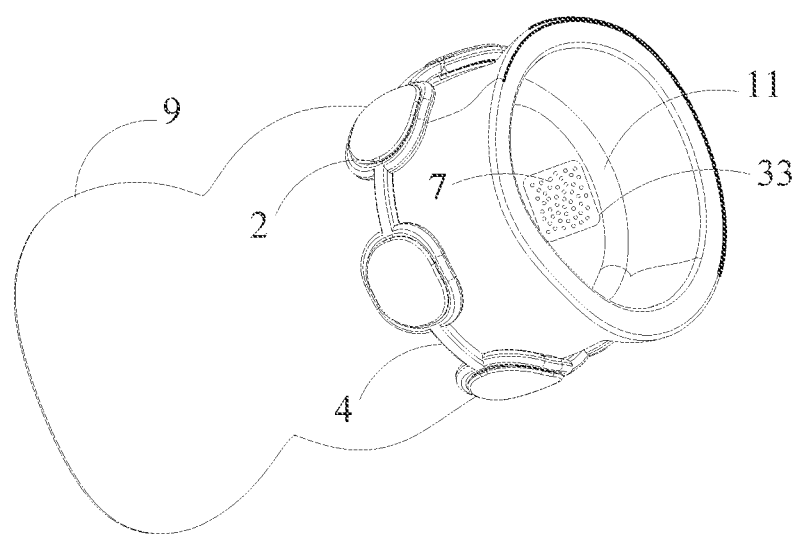
FIG. 29 is a schematic view of an anastomosis protection device applied to the intestine according to a fourteenth embodiment of the present disclosure.

FIG. 29 is a schematic view of an anastomosis protection device applied to the intestine according to a fourteenth embodiment of the present disclosure. The difference between this embodiment and the first embodiment is that the anastomosis protection device includes a plurality of block-shaped first fixing member 2 and a circular first connector 4 arranged outside the tubular tissue. The second fixing member is formed by a second magnetic particle coating 33 formed by internal magnetic particles 7, and the second magnetic particle coating 33 is directly coated on the inner surface of the protective sleeve 1. The first fixing members 2 are positioned correspondingly to the positions of the second magnetic particle coatings 33. The first fixing members 2 can adopt a structure coated with a first magnetic particle coating or internally doped with magnetic particles, or a non-magnetic material that can be attracted by the magnet, such as iron, nickel, cobalt or other magnetic and their alloys, or a magnetic material, such as a magnet. Therefore, the first fixing members 2 and the second magnetic particle coatings 33 can be magnetically attracted to each other, thereby fixing the protective sleeve 1 at the desired position without affecting normal intestinal peristalsis and blood supply around the tissue.

Figure 30:
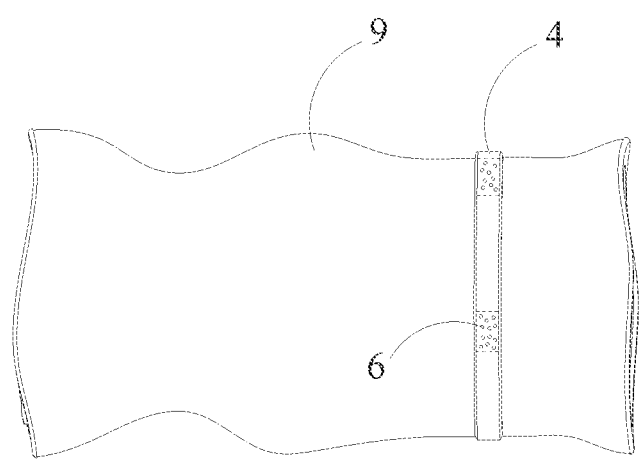
FIG. 30 is a schematic view of an anastomosis protection device applied to the intestine according to a fifteenth embodiment of the present disclosure.

FIG. 30 is a schematic view of an anastomosis protection device applied to the intestine according to a fifteenth embodiment of the present disclosure. In this embodiment, there is only one first fixing member, the first fixing member is a first connector 4 surrounding the outer wall of the intestinal tissue 9, and the surface of the first connector 4 is coated with a plurality of third magnetic particle coatings formed by external magnetic particles 6, or the first connector 4 is doped with external magnetic particles 6. The second fixing member can adopt the structures of the second fixing members in any of the above embodiments, that is, the structure of the second fixing member 3 can be adopted, or the structure directly coated with a plurality of second magnetic particle coatings can be adopted. The second fixing member 3 can be a magnetic member or a non-magnetic member, for example, it can use a structure with magnetic particles distributed or be made of magnetic materials. In addition, the second fixing member can also adopt a structure similar to the first fixing member in this embodiment, that is, the second fixing member can be a second connector surrounding the inner wall of the protective sleeve 1, and the surface of the second connector is coated with a plurality of fourth magnetic particle coatings or the second connector is doped with magnetic particles.

In another alternative embodiment, the second fixing member may also include a second connector surrounding the inner wall of the protective sleeve 1, with a plurality of fourth magnetic particle coatings coated on the surface of the second connector 5 or magnetic particles doped inside the second connector 5. Meanwhile, the first fixing member can adopt the structure of the first fixing members in any of the above embodiments, that is, the structure of the first fixing member 2 can be adopted. The first fixing member 2 can be a magnetic member or a non-magnetic member, for example, it can use a structure with magnetic particles distributed or use magnetic materials.

Figure 31:
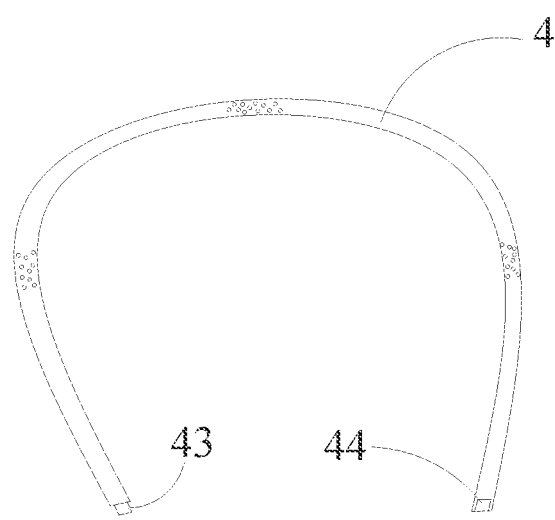
FIG. 31 is a schematic view of a first connector in a disconnection state according to the fifteenth embodiment of the present disclosure.

As shown in FIG. 31, to facilitate the installation and removal of the first connector 4, the first connector 4 can be further provided with a connection structure. Two ends of the first connector 4 can be connected at the connection structure to surround the outer wall of the intestinal tissue 9, for example, to form a closed circular structure, or be disconnected at the connection structure to be separated from the outer wall of the intestinal tissue 9. The connection structure shown in FIG. 31 includes a connection protrusion 43 and a connection groove 44 arranged at two ends, respectively. When the connection protrusion 43 is embedded in the connection groove 44, the first connector 4 is circular. When the connection protrusion 43 is separated from the connection groove 44, the first connector 4 is in a strip shape or other unclosed shape. In other alternative embodiments, the connection structure can also be in other forms, such as a form including a connection ring and a connection hook at two ends, hooking the connection ring and the connection hook together or separating them to achieve two states of the first connector 4, or a form including bonding structures at both ends to achieve two states of the first connector 4 through bonding or separating the bonding structures, and so on.

Figure 32:
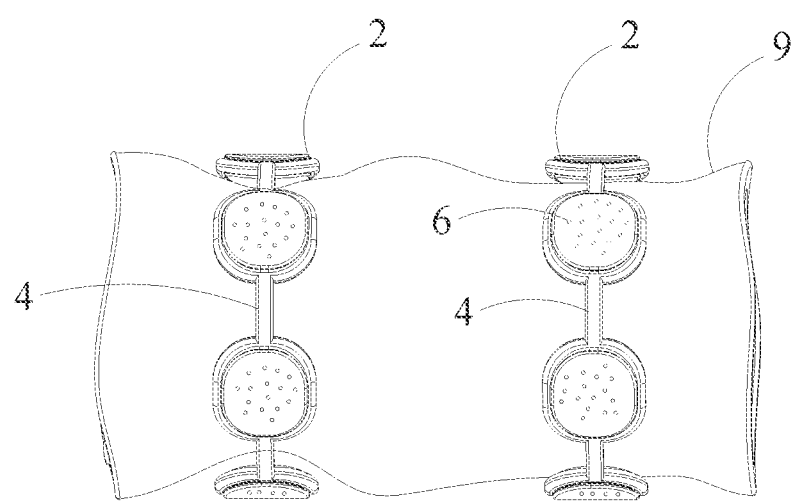
FIG. 32 is a schematic view of an anastomosis protection device applied to the intestine according to a sixteenth embodiment of the present disclosure.
Figure 33:
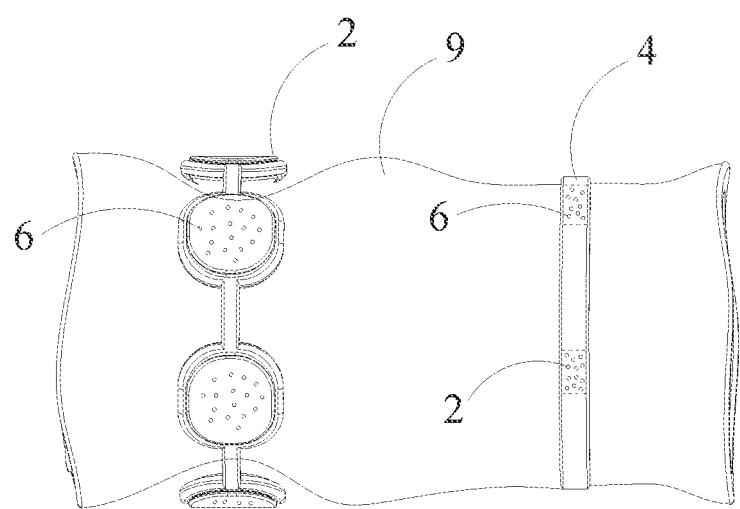
FIG. 33 is a schematic view of an anastomosis protection device applied to the intestine according to a seventeenth embodiment of the present disclosure.
Figure 34:
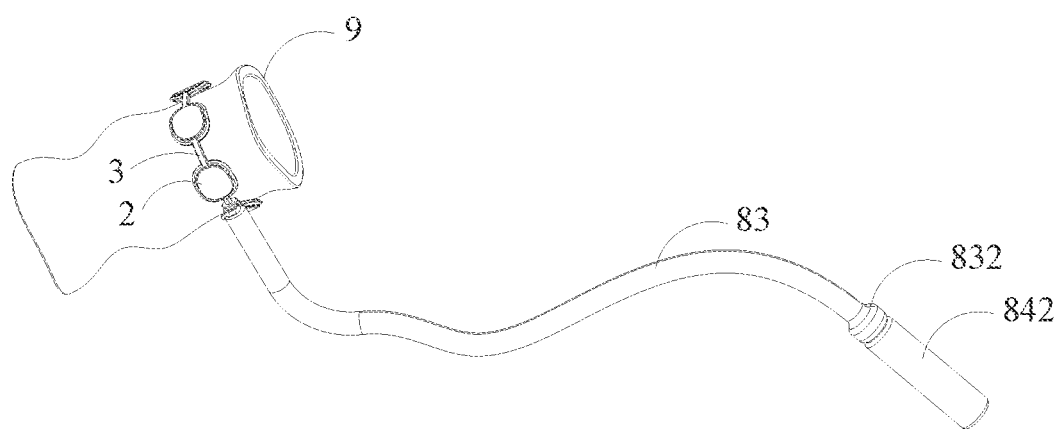
FIG. 34 is a schematic view of an anastomosis protection device applied to the intestine according to an eighteenth embodiment of the present disclosure.
Figure 35:
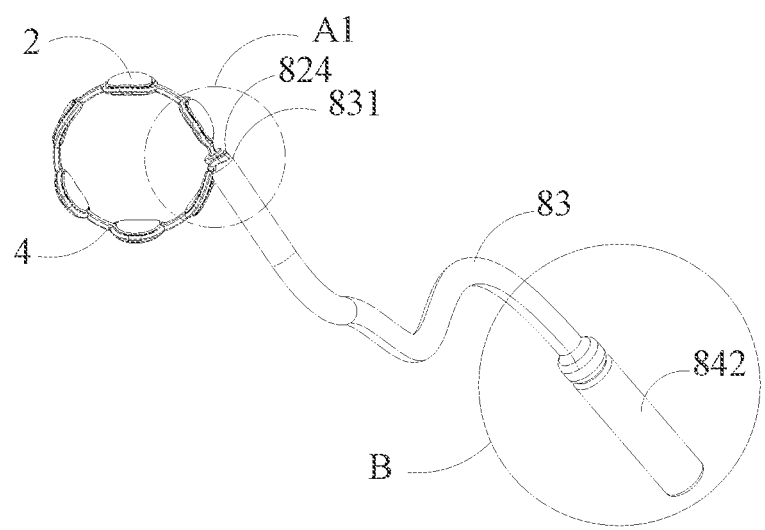
FIG. 35 is a schematic view of a cooperation between a first fixing assembly and an operating assembly according to the eighteenth embodiment of the present disclosure.

FIG. 32 is a schematic view of an anastomosis protection device applied to the intestine according to a sixteenth embodiment of the present disclosure. FIG. 33 is a schematic view of an anastomosis protection device applied to the intestine according to a seventeenth embodiment of the present disclosure. In the sixteenth and seventeenth embodiments, the anastomotic protection device can be used to protect anastomotic stoma at a high position in the intestine. A fixing assembly is installed in the intestinal tissue 9 at an upstream side of the anastomotic stoma, and another fixing assembly is installed in the intestinal tissue 9 at a downstream side of the anastomotic stoma. This structure can greatly reduce the required length of the protective sleeve 1 and facilitate the placement of protective sleeve 1 during surgery and the removal of protective sleeve 1 after the anastomotic stoma is healed. On the other hand, it can better fix the protective sleeve 1 at the required position, ensuring stability during use. FIGS. 32 and 33 show two implementation ways of fixing the protective sleeve 1. In other alternative embodiments, the first and second fixing members at the upstream and downstream sides of the anastomotic stoma can adopt the structures of the fixing members in any of the above embodiments, all of which fall within the protection scope of the present disclosure.

Furthermore, to facilitate the installation of the first connector 4 on the tubular tissue and the removal of the first connector 4, some embodiments of the present disclosure also provide operating components. The operating components can be used to disconnect the first connector 4 or connect the first connector 4 to a closed ring. The first connector 4 includes a first state and a second state. When the first connector 4 is in the first state, the first connector 4 surrounds the outer wall of the tubular tissue to fix the protective sleeve 1 through the first fixing member 2. When the first connector 4 is in the second state, the first connector 4 is in an unclosed strip shape and can separate from the outer wall of the tubular tissue. The operating assembly includes a first operating member and a second operating member, wherein the first operating member is connected to a first end of the first connector 4, and the second operating member is relatively fixed to the first operating member in the first direction. After the anastomotic stoma is healed, the first fixing member 2 and the protective sleeve 1 need to be removed, the second operating component is operated outside the body to separate a second end of the first connector 4 from the second operating component. The first end and second end of the first connector 4 are separated from each other to form an unclosed strip, which can separate from the outer wall of the tubular tissue. The first connector 4 can be directly removed through the first operating member, without a need for secondary surgery, the operation is simple and secondary trauma to the patient is avoided.

The structures of anastomosis protection devices of eighteenth to twentieth embodiments of the present disclosure are described in detail as below combined with FIGS. 34-44.

FIGS. 34-41 are structural schematic views of an anastomosis protection device applied to the intestinal tissue 9 according to an eighteenth embodiment of the present disclosure. As shown in FIGS. 34-37, the anastomosis protection device includes a protective sleeve 1, a first fixing structure, and an operating assembly. The protective sleeve 1 can adopt the structure and material of the protective sleeve 1 in the first embodiment mentioned above. The first fixing structure includes at least one first fixing member 2 and a first connector 4, wherein the first connector 4 includes a first state surrounding the intestinal tissue 9 and a second state that can be separated from the intestinal tissue 9. The operating assembly includes a first operating member 83 and a second operating member 84, the first operating member 83 is connected to a first end of the first connector 4, and the second operating member 84 is relatively fixed to the first operating member 83 in the first direction. When the first connector 4 is in the first state, a second end of the first connector 4 is connected to the second operating member 84, the first connector 4 surrounds the outer wall of the intestinal tissue 9, and the second operating member 84 at least partially extends out of the body. When the first connector 4 is in the second state, the second end of the first connector 4 is separated from the second operating member 84, and the first connector 4 is in an unclosed strip shape and can be separated from the outer wall of the intestinal tissue 9.

Therefore, when it is necessary to fix the protective sleeve 1 and the first connector 4 at the anastomotic stoma to protect the tissue, the second end of the first connector 4 can be connected to the second operating member 84, and the first and second ends of the first connector 4 can be connected to form a ring through the operating assembly. The first connector 4 can fix the protective sleeve 1 at the desired position. After the anastomotic stoma is healed, when the first connector 4 needs to be removed, the second operating member 84 is operated outside the body to separate the second end of the first connector 4 from the second operating member 84. The first and second ends of the first connector 4 are separated to form an unclosed strip, which can be separated from the outer wall of the intestinal tissue 9. At this time, as the first end of the first connector 4 is still connected to the first operating member 83, The first connector 4 can be directly removed through the first operating member 83, without a need for secondary surgery, the operation is simple and secondary trauma to the patient is avoided.

Figure 38:
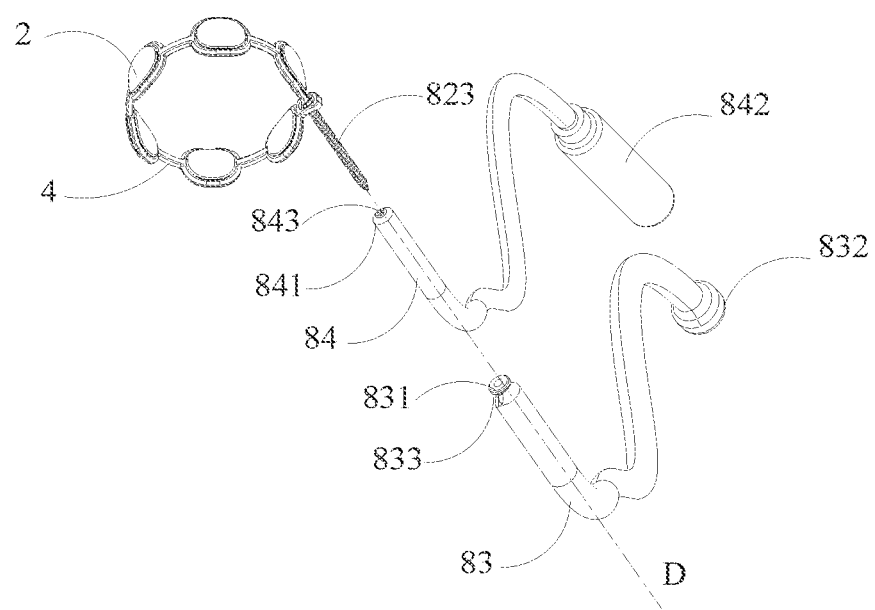
FIG. 38 is a schematic view of a cooperation between a first fixing assembly and an operating assembly according to the eighteenth embodiment of the present disclosure.

As shown in FIG. 38, in this embodiment, the first operating member 83 is tubular, and the first operating member 83 is sleeved outside the second operating member 84. The first direction is an axial direction of the first operating member 83 at the first end 831 thereof, which is the D direction in FIG. 38. The first end 831 of the first operating member 83 is connected to the first end of the first connector 4. The second operating member 84 is rotatable relative to the first operating member 83, and the second end of the first connector 4 is provided with a first threaded portion 823. The first end 841 of the second operating member 84 is provided with a second threaded portion 843. When the first connector 4 is in the first state, the first threaded portion 823 and the second threaded portion 843 are mutually thread matched. By matching and connecting the first threaded portion 823 with the second threaded portion 843, the first connector 4 enters the first state.

Figure 39:
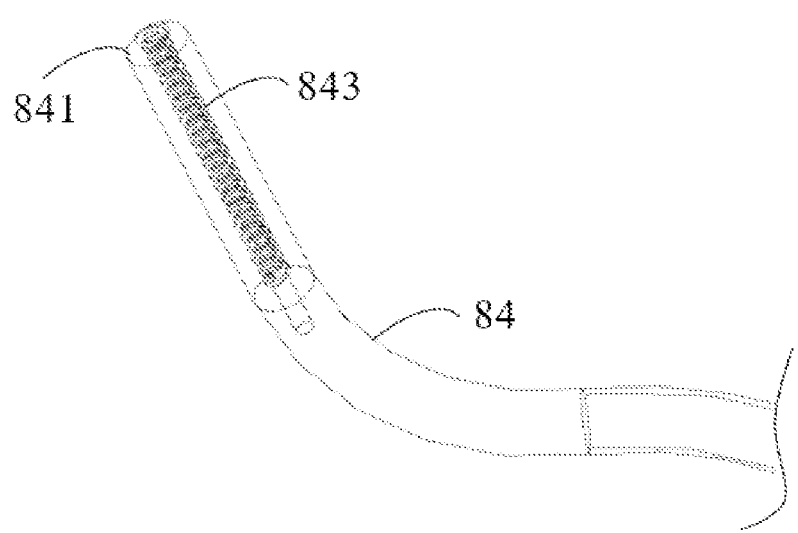
FIG. 39 is a schematic view of a threaded hole of a second operating component according to the eighteenth embodiment of the present disclosure.

As shown in FIGS. 38 and 39, in this embodiment, the first threaded portion 823 is a screw rod extending along the first direction D, the second threaded portion 843 is a threaded hole also extending along the first direction D. When the first connector 4 needs to enter the first state, the screw rod is inserted into an end of the threaded hole, and then the second operating member 84 is operated to rotate relative to the first operating member 83. Since the first end of the first operating member 83 is connected to the second end of the first connector 4, the second operating member 84 also rotates relative to the first connector 4, causing the screw rod to rotate into the threaded hole to connect the second end of the first connector 4 with the first end 841 of the second operating member 84. When the first connector 4 enters the second state, it is necessary to rotate the second operating member 84 in an opposite direction, so that the screw rod can be unscrewed from the threaded hole. The first operating member 83 and the second operating member 84 are selectively made of materials with a certain flexibility, such as silicone, plastic, rubber, polyvinyl chloride (PVC), etc. Therefore, the shapes of the first operating member 83 and the second operating member 84 shown in the accompanying drawings are not fixed shapes but schematically show their flexibility effect. In another alternative implementation, the first threaded portion 823 can be a threaded hole, and the second threaded portion 843 can be a screw rod, with a same working principle as the implementation shown in FIG. 38. In the above embodiment, the first threaded portion 823 and the second threaded portion 843 can further have threads with varying pitches.

Figure 37:
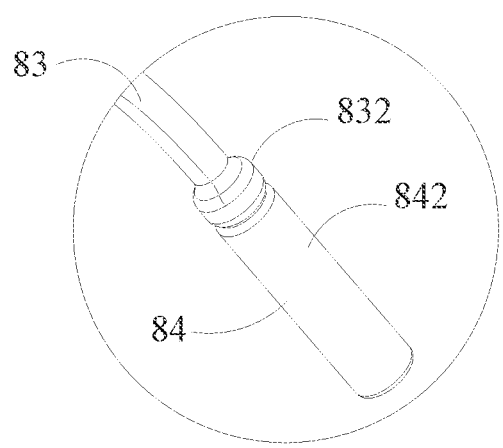
FIG. 37 is a partially enlarged view at B of FIG. 2.

As shown in FIGS. 37 and 38, to facilitate direct operation of the second operating member 84 outside the body, the second end of the second operating member 84 at least partially extends outside from the second end of the first operating member 83. And in the first state, the second end of the second operating member 84 is located outside the body. When the first connector 4 needs to be detached, the second end of the second operating member 84 can be directly operated outside the body to rotate relative to the first connector 4 in a set direction.

To further facilitate the operation of the second operating member 84, the second end of the second operating member 84 is provided with an operating handle 842, which is partially or entirely located outside the second end of the first operating member 83, and an outer diameter of the operating handle 842 is greater than an inner diameter of the second end of the first operating member 83, thereby preventing the operating handle 842 from entering the interior of the first operating member 83, effectively maintaining the first operating member 83 being fixed to the second operating member 84 in the axial direction D.

Furthermore, as shown in FIGS. 37 and 38, the second end of the first operating member 83 is provided with a step portion 832, and an end surface of the step portion 832 is matched with an end surface of the operating handle 842, that is, the end surface of the step portion 832 facing the operating handle 842 is matched with the end surface of the operating handle 842 facing the step portion 832, so that the cooperation between the first operating member 83 and the second operating member 84 is more stable.

Figure 36:
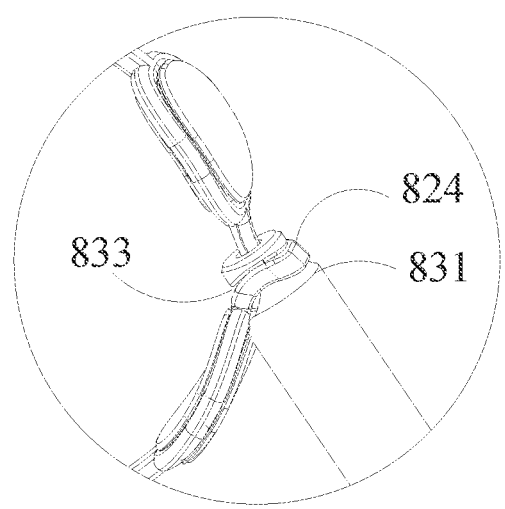
FIG. 36 is a partially enlarged view at A1 of FIG. 2.

FIG. 36 shows a cooperation method between the first end of the first connector 4 and the first end 831 of the first operating member 83 in this embodiment. As shown in FIGS. 36 and 38, the first end of the first connector 4 is provided with a snap ring 824, and the first end 831 of the first operating member 83 is provided with a snap groove 833. The first end 831 of the first operating member 83 passes through the snap ring 824, and the snap ring 824 is sleeved on the snap groove 833. Therefore, the first end of the first connector 4 can be stably connected with the first end of the first operating member 83, and cooperation of the snap ring 824 and the snap groove 833 will not affect the needed connection and separation between the second end of the first connector 4 and the first end 841 of the second operating member 84.

The snap ring 824 can be elastic, for example, made of elastic materials such as rubber, plastic, silicone, etc. When the snap ring 824 is sleeved on the snap groove 833, the elastic force of the snap ring 824 tightens the snap groove 833 to fix the position of the nap groove 833, achieving a stable connection between the first connector 4 and the first operating member 83. When needed, the snap groove 833 can also be separated from the snap ring 824 to separate the first connector 4 from the first operating member 83. For example, the first connector 4 and the first operating member 83 can be stored separately before use. During surgery, the snap ring 824 of the first connector 4 is sleeved on the snap groove 833 to connect the first connector 4 with the first operating member 83. Then, the first connector 4 is placed inside the body and the second operating member 84 is rotated, causing the first connector 4 to enter a first state.

As shown in FIG. 38, in this embodiment, an inner diameter of the snap groove 833 is smaller than an outer diameter of the first end 841 of the second operating member 84, thereby further ensuring that the second operating member 84 won't extend out of the first end 831 of the first operating member 83, and ensuring the second operating member 4 being fixed to the first operating member 83 in the axial direction D.

In another alternative implementation, a snap groove can also be provided at the first end of the first connector 4, and a snap ring matched with the snap groove is provided at the first end 831 of the first operating member 83. The first end of the first connector 4 is inserted into the snap ring of the first operating member 83 to fix the first connector 4 to the first operating member 83.

Figure 40:
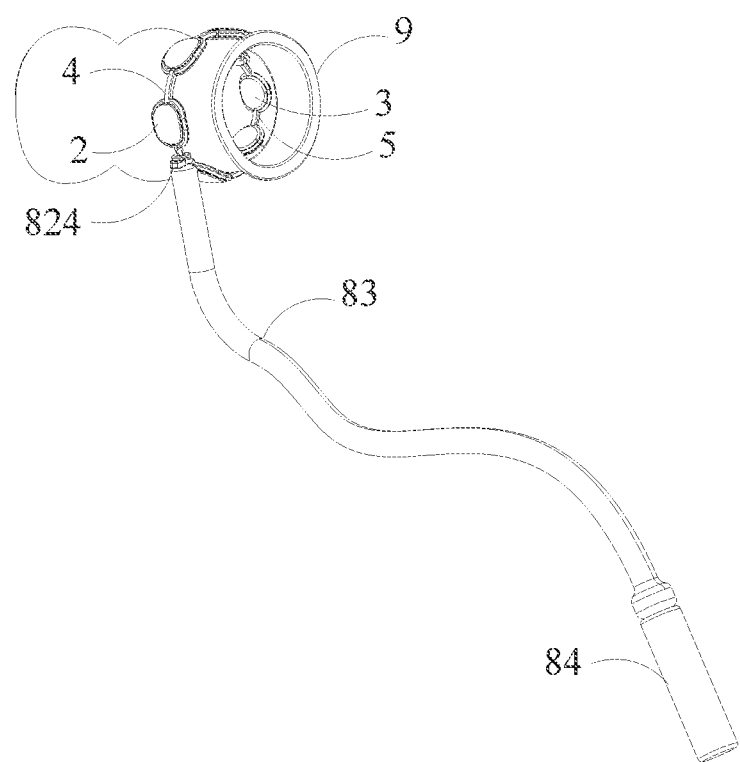
FIG. 40 is a schematic view of an anastomosis protection device applied to the intestine according to an eighteenth embodiment of the present disclosure.
Figure 41:
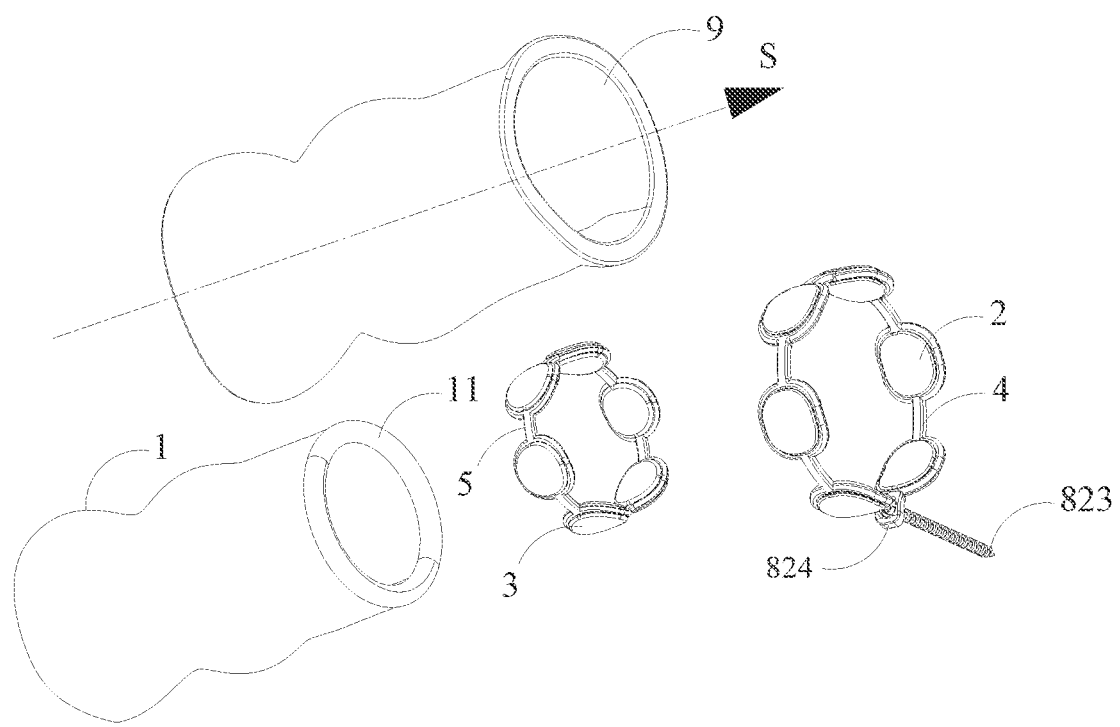
FIG. 41 is an exploded view of the anastomosis protection device according to the eighteenth embodiment of the present disclosure.

FIGS. 40 and 41 show the structure of fixing the protective sleeve 1 in this embodiment. In this embodiment, the anastomosis protection device further includes a second fixing structure, which is arranged on an inner surface of the protective sleeve 1. The second fixing structure includes a plurality of second fixing members 3 and a second connector 5 being configured to accommodate the second fixing members 3. The second fixing members 3 and the first fixing members 2 are magnetically attached to each other. Therefore, the second fixing structure and the first fixing structure can together fix the protective sleeve 1 at the desired position. When the first connector 4 is in the first state, the first connector 4 extends along the circumferential direction of the intestinal tissue 9, and the first fixing members 2 are magnetically attached to the corresponding second fixing members 3. In each pair of fixing members including a first fixing member 2 and a corresponding second fixing member 3, at least one fixing member is a magnetic member. When the first fixing member 2 and the second fixing member 3 are magnetic members, the magnetic polarity of the first fixing member 2 is opposite to that of the second fixing member 3. When only one fixing member in each pair is a magnetic member, the other uses materials that can be attracted by magnets, such as iron or other similar metals. The protective sleeve 1 is provided with a support portion 11 at the upstream side (i.e., the right side along the S direction in FIG. 41) of the anastomotic stoma, and the support portion 11 can expand and contract in the radial direction of the protective sleeve 1. When the support portion 11 contracts in the radial direction, the protective sleeve 1 can be placed into or taken out of the intestinal tissue 9 as a whole. After the protective sleeve 1 is placed at the desired position, the support portion 11 expands in the radial direction to support the protective sleeve 1, achieving better adhesion and sealing with the intestinal wall, and preventing the contents from entering the anastomotic stoma. The support portion 11 can adopt an inflatable and deflatable circular elastic airbag, and the outer wall of the airbag is elastic, using materials such as elastic rubber, silicone, TPU, or thin PC material, etc. After inflation, the support portion 11 attaches to the tissue wall, and when there are contents passing through, the circumferential length can be increased to fit the intestine well. The support portion 11 is arranged at the upstream side of the anastomotic stoma, and the first connector 4 can be arranged between the support portion 11 and the anastomotic stoma, or a combination of the first fixing structure and the second fixing structure can be arranged between the support portion 11 and the anastomotic stoma, while another combination is arranged at the downstream side of the anastomotic stoma.

Figure 42:
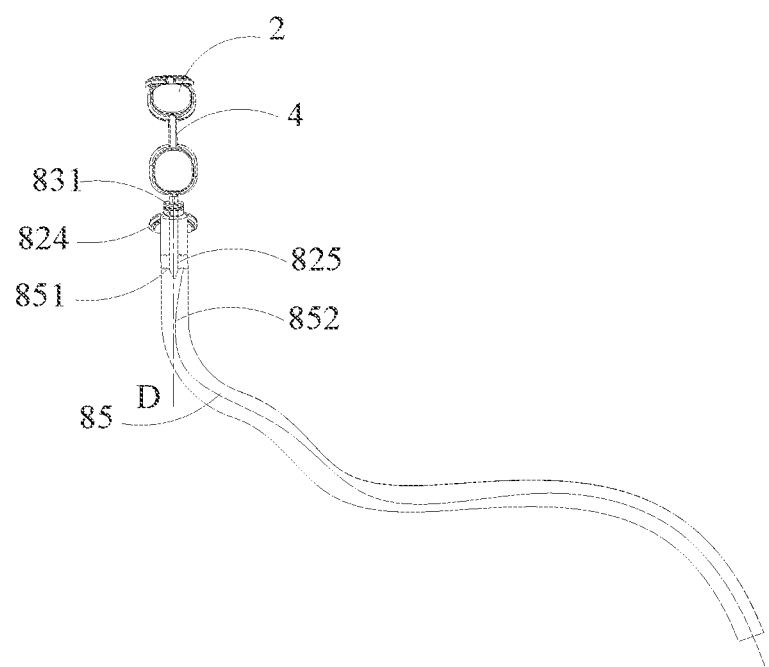
FIG. 42 is a structural schematic view of the anastomosis protection device according to a nineteenth embodiment of the present disclosure.

FIG. 42 is a structural schematic view of the anastomosis protection device according to a nineteenth embodiment of the present disclosure. In this embodiment, the second operating member 85 includes an inflatable balloon 851, which is relatively fixed to the first operating member 83 in the first direction. The balloon 851 includes a third state and a fourth state. A first end of the inflation tube 852 is connected to the interior of the balloon 851, used to inflate and deflate the balloon 851. The second end of the first connector 4 is equipped with a balloon matching portion 825. When the first connector 4 is in the first state, the balloon 851 is in the third state, and the balloon 851 is relatively fixed with the balloon matching portion 825. A second end of the inflation tube 852 extends outside the body. When the first connector 4 is in the second state, the balloon 851 is in the fourth state, and the balloon 851 can be separated from the balloon matching portion 825. In this embodiment, the interior of the balloon is provided with matching holes. When the first connector 4 needs to enter the first state, the balloon matching portion 825 is inserted into the matching hole, and the balloon 851 is inflated through the inflation tube 852, so that an inner diameter of the matching hole of the balloon 851 is reduced, and the balloon matching portion 825 is relatively fixed to the balloon 851. When the first connector 4 needs to be removed, the balloon 851 is deflated through the inflation tube 852, and the inner diameter of the matching hole of the balloon 851 becomes greater. The balloon matching portion 825 can be removed from the matching hole of the balloon 851.

In another alternative implementation, the balloon matching portion 825 can also be provided with a matching hole. When the first connector 4 is in the first state, the balloon 851 is inserted into the matching hole, and the balloon 851 is inflated through the inflation tube 852, so the balloon closely fits the matching hole. When the first connector 4 needs to be removed, the balloon 851 is deflated through the inflation tube 852, so that the balloon 851 can be removed from the mating hole.

Figure 43:
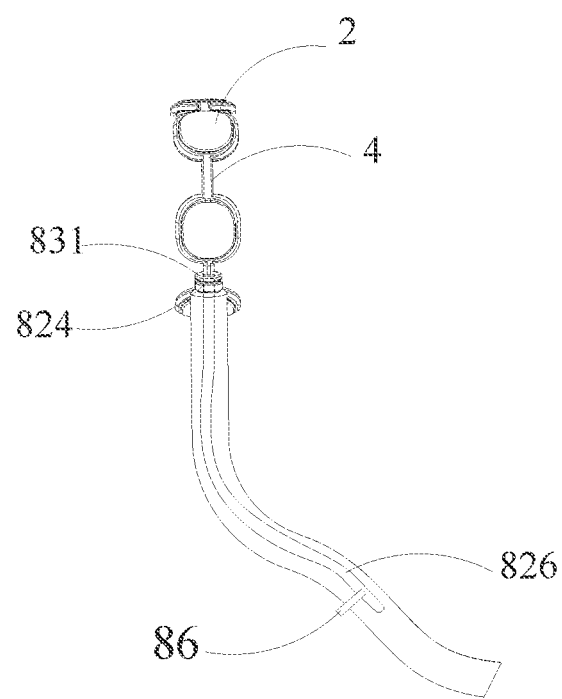
FIG. 43 is a structural schematic view of the anastomosis protection device according to a twentieth embodiment of the present disclosure.

FIG. 43 is a structural schematic view of the anastomosis protection device according to a twentieth embodiment of the present disclosure. In this embodiment, when the first connector 4 is in the first state, the second end of the first connector 4 and the second operating member 86 are connected through a detachable connection structure located outside the body. Specifically, in this embodiment, the second end of the first connector 4 is provided with an operating member matching portion 826. The detachable connection structure includes the second operating member 86 and a slot provided on the operating member mating part 826. When the second operating member 86 is inserted into the slot, the second end of the first connector 4 is connected to the second operating member 86. When the second operating member 86 is removed from the slot, the second end of the first connector 4 is separated from the second operating member 86. In other alternative embodiments, the second operating member 86 can also adopt structures such as hooks, hanging ropes, etc., and a matching hole, a groove, or a protrusion can also be provided on the operating member matching portion 826, which can achieve a detachable connection between the second operating member 86 and the operating member matching part 826, and the connection structure can be operated outside the body.

In the eighteenth to twentieth embodiments mentioned above, the first connector 4 can be elastic, and the first threaded portion 823 can be non-elastic.

The materials of the anastomosis protection devices of different embodiments provided by the present disclosure are selectively biocompatible.

The anastomosis protection device provided by the present disclosure has the following advantages:

The present disclosure protects the inner surface of the anastomotic stoma through a protective sleeve, so contents in the tubular tissue won't contaminate the anastomotic stoma when passing through. The protective sleeve is fixed at the desired position through magnetic attraction between the first fixing member and the second fixing member. In this device, only the magnetic attraction position between the first fixing member and the second fixing member is relatively fixed, and a circumferential length can be elastically adjustable, providing sufficient circumferential extension and retraction space for the tissue. During the peristalsis of contents inside the tissue or the tissue itself, the device ensures normal blood supply around the anastomotic stoma.

The above is a detailed description of the present disclosure in connection with the specific preferred embodiments, and the specific embodiments of the present disclosure are not limited to the description. Modifications and substitutions can be made without departing from the spirit and scope of the present disclosure.

What is claimed is:

1. An anastomosis protection device comprising:
   a protective sleeve configured to be located inside a tubular tissue and positioned correspondingly to an anastomotic stoma;
   at least one fixing assembly, wherein the at least one fixing assembly comprises a plurality of first fixing members, a plurality of second fixing members and a first connector, wherein the first fixing members are configured to be provided on an outer wall of the tubular tissue, the second fixing members are configured to be provided on an inner surface of the protective sleeve and positioned correspondingly to the first fixing members, and the first fixing members and the second fixing members are relatively fixed by means of magnetic attraction;
   wherein, the first connector comprises a plurality of first accommodating portions and a plurality of first elastic connecting portions, the accommodating portions are configured to accommodate the first fixing members, and each of the first elastic connecting portions is connected between two adjacent first accommodating portions, the first accommodating portions and the first elastic connecting portions are integrally formed;
   wherein an elasticity of the first accommodating portions is smaller than an elasticity of the first elastic connecting portions, a width of each of the first accommodating portions is adapted to a width of each of the first fixing members, and the width of each of the first accommodating portions is greater than a width of each of the first elastic connecting portions.

2. The device of claim 1, wherein the first fixing members are arranged at intervals and the second fixing members are arranged at intervals, wherein the first fixing members are configured to be arranged sequentially along a circumferential direction of the tubular tissue, and the second fixing members are configured to be arranged sequentially along the circumferential direction of the tubular tissue.

3. The device of claim 2, wherein one of the first fixing members and a corresponding second fixing member form a pair of fixing members, wherein in each pair of fixing members, both the first fixing member and the second fixing member are magnetic members; or, the first fixing members are magnetic members and the second fixing members are non-magnetic members; or, the first fixing members are non-magnetic members and the second fixing members are magnetic members.

4. The device of claim 1, wherein the at least one fixing assembly is configured to be provided at an upstream side of the anastomotic stoma; or, there are two fixing assemblies, one of the fixing assemblies is configured to be located at an upstream side of the anastomotic stoma, and the other one is configured to be located at a downstream side of the anastomotic stoma.

5. The device of claim 4, wherein one end of the protective sleeve configured to be located at the upstream of the anastomotic stoma is provided with a support portion, the support portion is expandable and contractable in a radial direction of the protective sleeve, and at least one the fixing assembly is configured to be arranged between the anastomotic stoma and the support portion.

6. The device of claim 1, wherein the first connector is configured to surround the outer wall of the tubular tissue.

7. The device of claim 6, wherein the first connector is provided with a connection structure, and the first connector is configured to be connected at the connection structure to surround the outer wall of the tubular tissue or disconnected at the connection structure to be separated from the outer wall of the tubular tissue.

8. The device of claim 6, wherein the device further comprises:
an operating assembly comprising a first operating member and a second operating member, wherein the first operating member is connected to a first end of the first connector, and the second operating member is relatively fixed to the first operating member in a first direction;
the first connector has a first state and a second state, when the first connector is in the first state, a second end of the first connector is connected to the second operating member, the first connector is configured to surround the outer wall of the tubular tissue, and the second operating member is configured to extend at least partially out of a body;
when the first connector is in the second state, the second end of the first connector separates from the second operating member, and the first connector is in an unclosed strip shape that is detachable from the outer wall of the tubular tissue.

9. The device of claim 8, wherein the first operating member is tubular and sleeved outside the second operating member, and the first direction is an axial direction of the first operating member at a first end of the first operating member;
the second operating member is rotatable relative to the first operating member, the second end of the first connector has a first threaded portion, a first end of the second operating member has a second threaded portion, when the first connector is in the first state, the first threaded portion is threaded and connected to the second threaded portion.

10. The device of claim 8, wherein the second operating member comprises:
an inflatable balloon relatively fixed to the first operating member in the first direction, and the balloon having a third state and a fourth state; and an inflation tube, a first end of the inflation tube connected to an interior of the balloon and configured to inflate or deflate the balloon;
wherein the second end of the first connector is provided with a balloon matching portion, when the first connector is in the first state, and the balloon is in the third state, the balloon is fixed with the balloon matching portion, a second end of the inflation tube is configured to extend out of the body; when the first connector is in the second state, and the balloon is in the fourth state, the balloon is detachable from the balloon matching portion.

11. The device of claim 1, wherein the at least one fixing assembly further comprises a second connector configured to accommodate the second fixing members, and the second connector is positioned at the inner surface of the protective sleeve.

12. The device of claim 11, wherein the second connector is integrally formed with the protective sleeve.

13. The device of claim 1, wherein the at least one fixing assembly further comprises a second connector configured to accommodate the second fixing members, the first connector is configured to surround the outer wall of the tubular tissue, and the second connector is positioned at the inner surface of the protective sleeve, each of the first connector and the second connector is elastic, the second connector comprises a plurality of second accommodating portions and a plurality of second elastic connecting portions, the second accommodating portions are configured to accommodate the second fixing members, and each of the second elastic connecting portions is connected between two adjacent second accommodating portions.

14. The device of claim 13, wherein the second accommodating portions and the second elastic connecting portions meet at least one of the following conditions:
an elasticity of the second accommodating portions is smaller than an elasticity of the second elastic connecting portions;
a width of each of the second accommodating portions is adapted to a width of each of the second fixing members, and the width of each of the second accommodating portions is greater than a width of each of the second elastic connecting portions;
a thickness of each of the second accommodating portions is greater than a thickness of each of the second elastic connecting portions;
each of the second accommodating portions is a circular structure surrounding each of the second fixing members, and a width of a wall of the circular structure is greater than the width of each of the second elastic connecting portions.

15. The device of claim 1, wherein the at least one fixing assembly further comprises a second connector configured to accommodate the second fixing members, wherein the first connector is configured to surround the outer wall of the tubular tissue, and the second connector is positioned on the inner surface of the protective sleeve, the second connector is positioned correspondingly to the first connector;
wherein circumferences of the first fixing members are at least partially provided with a plurality of mounting grooves, and an inner circumference of the first connector is embedded in the mounting grooves, or the inner circumference of the first connector is at least partially provided with a plurality of mounting grooves, and the first fixing members are embedded in the mounting grooves; and wherein circumferences of the second fixing members are at least partially provided with a plurality of mounting grooves, and an inner circumference of the second connector is embedded in the mounting grooves, or the inner circumference of the second connector is at least partially provided with a plurality of mounting grooves, and the second fixing members are embedded in the mounting grooves.

16. The device of claim 1, wherein the inner surface of the protective sleeve is provided with a plurality of mounting grooves in one-to-one correspondence to the second fixing members, and the second fixing members are embedded in the corresponding mounting grooves, the second fixing members and the mounting grooves are in interference fit.

17. The device of claim 1, wherein the first fixing members are sequentially connected end to end to form a circle, and a connecting portion formed between two adjacent first fixing members is extendable and retractable; and/or,
wherein the second fixing members are sequentially connected end to end to form a circle, and a connecting portion formed between two adjacent second fixing members is retractable.

18. The device of claim 1, wherein magnetic particles are distributed in the first fixing members and/or the second fixing members.

19. The device of claim 1, wherein each of the second fixing members comprises at least one second magnetic particle coating, which is coated on the inner surface of the protective sleeve.

* * * * *